(12) United States Patent
Takahashi

(10) Patent No.: US 12,401,490 B2
(45) Date of Patent: Aug. 26, 2025

(54) COMMUNICATION DEVICE AND COMMUNICATION METHOD

(71) Applicant: SONY SEMICONDUCTOR SOLUTIONS CORPORATION, Kanagawa (JP)

(72) Inventor: Hiroo Takahashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 688 days.

(21) Appl. No.: 17/753,523

(22) PCT Filed: Aug. 31, 2020

(86) PCT No.: PCT/JP2020/032877
§ 371 (c)(1),
(2) Date: Mar. 7, 2022

(87) PCT Pub. No.: WO2021/049354
PCT Pub. Date: Mar. 18, 2021

(65) Prior Publication Data
US 2022/0345287 A1    Oct. 27, 2022

(30) Foreign Application Priority Data
Sep. 13, 2019  (JP) ................................. 2019-166895

(51) Int. Cl.
*H04L 7/00* (2006.01)
(52) U.S. Cl.
CPC .......... *H04L 7/0054* (2013.01); *H04L 7/0041* (2013.01)

(58) Field of Classification Search
CPC ... H04L 7/0054; H04L 7/0041; H04W 56/001
USPC .......................... 375/356, 362, 371, 373, 375
See application file for complete search history.

(56) References Cited

U.S. PATENT DOCUMENTS

2019/0020433 A1* 1/2019 Pitigoi-Aron ....... H04W 56/001

FOREIGN PATENT DOCUMENTS

| JP | 2015-076805 A | 4/2015 |
| JP | 2015-198399 A | 11/2015 |
| JP | 2017-212690 A | 11/2017 |

OTHER PUBLICATIONS

International Search Report and Written Opinion of PCT Application No. PCT/JP2020/032877, issued on Nov. 17, 2020, 09 pages of ISRWO.

* cited by examiner

*Primary Examiner* — Phuong Phu
(74) *Attorney, Agent, or Firm* — CHIP LAW GROUP

(57) ABSTRACT

Provided is a communication device that includes a communication processing control section that controls communication processing in accordance with a predetermined standard with a plurality of sensors, and a time synchronization counter to implement a timing control defined in the standard. Then, information processing is performed for an output control that causes the time synchronization counter to time synchronize with time synchronization counters included in the respective sensors to output time data indicating a timing at which sampling data is sampled together with the sampling data sampled at a predetermined sampling cycle in the plurality of sensors.

7 Claims, 16 Drawing Sheets

COMMUNICATION DEVICE AND COMMUNICATION METHOD

CROSS REFERENCE TO RELATED APPLICATIONS

This application is a U.S. National Phase of International Patent Application No. PCT/JP2020/032877 filed on Aug. 31, 2020, which claims priority benefit of Japanese Patent Application No. JP 2019-166895 filed in the Japan Patent Office on Sep. 13, 2019. Each of the above-referenced applications is hereby incorporated herein by reference in its entirety.

TECHNICAL FIELD

The present the present disclosure relates to a communication device, a communication method, and a program, and more particularly, to a communication device, a communication method, and a program that make it possible to perform an appropriate output control based on time synchronization for a plurality of sensors.

BACKGROUND ART

In recent years, an I3C (Improved Inter Integrated Circuit) has been formulated as a next-generation standard of an I2C (Inter-Integrated Circuit), which is a bus standard, by an MIPI (Mobile Industry Processor Interface) Alliance that formulates an interface standard in a mobile apparatus. In addition, in the MIPI Alliance, a CSI-2 (Camera Serial Interface 2) is defined as an interface to be used mainly for coupling of a camera, and C-PHY and D-PHY are defined as standards of a physical layer.

For example, image data acquired by an image sensor is transmitted by the MIPI CSI-2 (C-PHY or D-PHY for the physical layer) because of a large amount of data to be transferred. Meanwhile, control data for controlling the image sensor and sensor data to be outputted from various measurement sensors are transmitted by the I2C or the I3C in accordance with the specification of the MIPI CSI-2 because of a small amount of data to be transferred.

In addition, a technique has been developed to multiplex one transmission path for a plurality of image sensors; for example, as disclosed in PTL 1, an output timing of image data in each of the plurality of image sensors is controlled using a synchronization signal.

CITATION LIST

Patent Literature

PTL 1: Japanese Unexamined Patent Application Publication No. 2017-212690 1

SUMMARY OF THE INVENTION

Problem to be Solved by the Invention

Incidentally, as described above, in a case where image data outputted from an image sensor is transmitted by C-PHY or D-PHY, while sensor data outputted from various measuring sensors is transmitted by an I2C or an I3C, output control to time synchronize those pieces of data becomes necessary. In addition, it is required, in a configuration to multiplex one transmission path for a plurality of image sensors, to perform output control based on time synchronization for the plurality of image sensors without providing a signal line for transmission of a synchronization signal from the outside.

The present disclosure has been made in view of such a circumstance, and makes it possible to perform an appropriate output control based on time synchronization for a plurality of sensors.

Means for Solving the Problem

A communication device according to a first aspect of the present disclosure includes: a communication processing control section that controls communication processing in accordance with a predetermined standard with a plurality of other communication devices; a time synchronization counter to implement a timing control defined in the standard; and an information processing section that performs information processing necessary for an output control that causes the time synchronization counter to time synchronize with other time synchronization counters included in the respective other communication devices to output sampling data sampled at a predetermined sampling cycle in the plurality of other communication devices, in which the information processing section performs an output control that causes time data indicating a timing at which the sampling data is sampled to be outputted together with the sampling data.

A communication method or a program according to a first aspect of the present disclosure includes: controlling communication processing in accordance with a predetermined standard with a plurality of other communication devices; and performing information processing necessary for an output control that causes a time synchronization counter for implementing a timing control defined in the standard to time synchronize with other time synchronization counters included in the respective other communication devices to output sampling data sampled at a predetermined sampling cycle in the plurality of other communication devices, in which an output control is performed that causes time data indicating a timing at which the sampling data is sampled to be outputted together with the sampling data.

In the first aspect of the present disclosure, communication processing is controlled in accordance with a predetermined standard with a plurality of other communication devices, and information processing necessary for an output control is performed that causes a time synchronization counter for implementing a timing control defined in the standard to time synchronize with other time synchronization counters included in the respective other communication devices to output sampling data sampled at a predetermined sampling cycle in the plurality of other communication devices. Then, an output control is performed that causes time data indicating a timing at which the sampling data is sampled to be outputted together with the sampling data.

A communication device according to a second aspect of the present disclosure includes: a sampling section that samples sampling data at a predetermined sampling cycle; a communication processing control section that controls communication processing in accordance with a predetermined standard with another communication device; and a time synchronization counter to implement a timing control defined in the standard, in which the time synchronization counter time synchronizes with another time synchronization counter included in the other communication device, in accordance with an output control by the other communication device, to output time data indicating a timing at which the sampling data is sampled, together with the sampling data.

A communication method or a program according to a second aspect of the present disclosure includes: sampling sampling data at a predetermined sampling cycle; controlling communication processing in accordance with a predetermined standard with another communication device; and causing a time synchronization counter for implementing a timing control defined in the standard to time synchronize with another time synchronization counter included in the other communication device, in accordance with an output control by the other communication device, to output time data indicating a timing at which the sampling data is sampled, together with the sampling data.

In the second aspect of the present disclosure, sampling data is sampled at a predetermined sampling cycle; communication processing is controlled in accordance with a predetermined standard with another communication device; and a time synchronization counter for implementing a timing control defined in the standard time synchronizes with another time synchronization counter included in the other communication device, in accordance with an output control by the other communication device, to output time data indicating a timing at which the sampling data is sampled, together with the sampling data.

MODES FOR CARRYING OUT THE INVENTION

Figure 1:
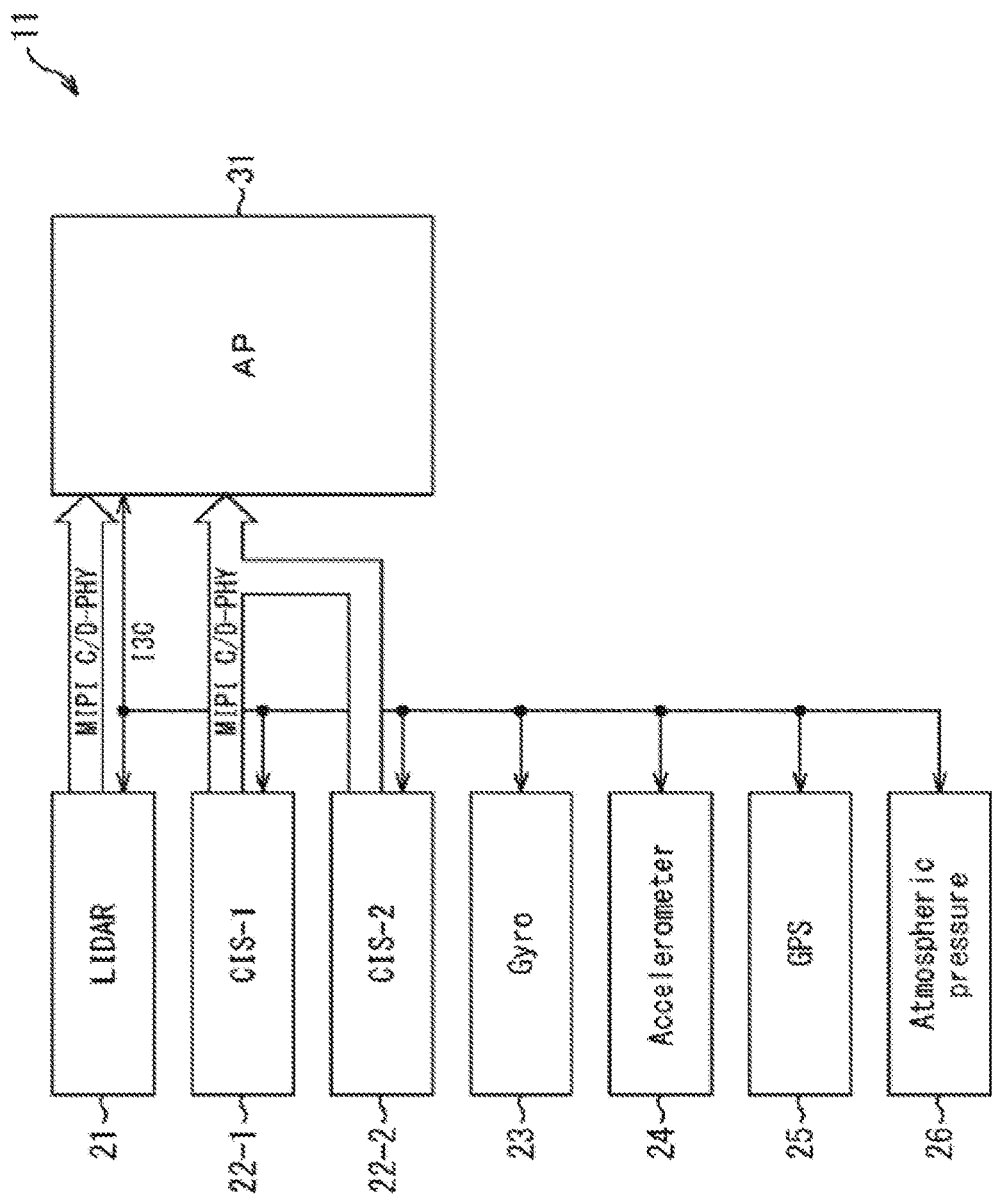
FIG. 1 is a block diagram illustrating a configuration example of an embodiment of a communication system to which the present technology is applied.

Hereinafter, description is given in detail, with reference to the drawing, of a specific embodiment to which the present technology is applied.
<Configuration Example of Communication System>

FIG. 1 is a block diagram illustrating a configuration example of an embodiment of a communication system to which the present technology is applied.

FIG. 1 illustrates an example of a communication system 11 used for communication between apparatuses in an unmanned aircraft (UAV: Unmanned Aerial Vehicle) referred to as a so-called drone, for example. It is to be noted that, the communication system 11 may be employed, for example, in various movable bodies, in addition to the drone, such as a vehicle that performs automated driving.

The communication system 11 includes a range sensor 21, image sensors 22-1 and 22-2, a gyro sensor 23, an acceleration sensor 24, a position sensor 25, an atmospheric pressure sensor 26, and an AP (Application Processor) 31.

For example, in the communication system 11, C-PHY or D-PHY is utilized for transmission of ranging data from the range sensor 21 to the AP 31 as well as for transmission of image data from the image sensors 22-1 and 22-2 to the AP 31. In addition, in the communication system 11, an I3C is utilized for transmission and reception of various types of data between the AP 31 and each of the range sensor 21, the image sensors 22-1 and 22-2, the gyro sensor 23, the acceleration sensor 24, the position sensor 25, and the atmospheric pressure sensor 26.

The range sensor 21 uses, for example, LIDAR (Light Detection and Ranging, Laser Imaging Detection and Ranging) to thereby calculate a distance to an obstacle around the drone and output the resulting ranging data to the AP 31.

The image sensors 22-1 and 22-2 capture an image around the drone using an imaging element such as a CIS (CMOS (Complementary Metal Oxide Semiconductor) Image Sensor), for example, to acquire image data. For example, the image sensor 22-1 captures an image in a traveling direction of the drone to acquire image data, and the image sensor 22-2 captures an image in a downward direction of the drone to acquire image data; each image data is outputted to the AP 31 via one transmission path.

The gyro sensor 23 measures an angular velocity generated in response to a change or the like in a flying attitude of the drone, and outputs, to the AP 31, angular velocity data obtained as a result of the measurement.

The acceleration sensor 24 measures acceleration in response to a change in a flying speed of the drone, and outputs, to the AP 31, acceleration data obtained as a result of the measurement.

The position sensor 25 receives a radio wave transmitted from a GPS (Global Positioning System) satellite, for example, and acquires GPS data included in the radio wave to output the acquired GPS data to the AP 31.

The atmospheric pressure sensor 26 measures an atmospheric pressure corresponding to an altitude at which the drone is flying, and outputs, to the AP 31, atmospheric pressure data obtained as a result of the measurement.

On the basis of time synchronization utilizing a portion of a timing control defined in the I3C between the AP 31 and each of the range sensor 21, the image sensors 22-1 and 22-2, the gyro sensor 23, the acceleration sensor 24, the position sensor 25, and the atmospheric pressure sensor 26, the AP 31 performs an output control thereon. Then, the AP 31 is able to integrate pieces of data outputted from the range sensor 21, the image sensors 22-1 and 22-2, the gyro sensor 23, the acceleration sensor 24, the position sensor 25, and the atmospheric pressure sensor 26 to execute various types of processing necessary for the flight of the drone, for example.

For example, a drone employing the communication system 11 is able to perform ranging using the range sensor 21 to perform imaging using the image sensors 22-1 and 22-2, and at the same time is able to calculate an inclination and acceleration of the drone itself. For example, while the drone flies, the AP 31 is able to recognize an obstacle in the traveling direction of the drone on the basis of the image data supplied from the image sensor 22-1, and is able to calculate a distance to the obstacle from the ranging data supplied from the range sensor 21. Then, on the basis of a self-position of the drone estimated from the GPS data, a speed of the drone calculated from the acceleration data, and an altitude of the drone estimated from the atmospheric pressure data and the image data, the AP 31 executes processing to cause the drone to take an evasive action in a case where there is a possibility of collision with an obstacle.

In addition, the AP 31 not only corrects the inclination of the drone on the basis of the attitude of the drone determined from the angular velocity data supplied from the gyro sensor 23, but also performs correction (e.g., keystone correction) of an inclination of the image captured by the image sensors 22-1 and 22-2, to thereby make it possible to facilitate detection of an obstacle.

At this time, the ranging data of the range sensor 21 and the image data of the image sensors 22-1 and 22-2 are transmitted by the C-PHY or the D-PHY because of a large amount of data to be transferred. In addition, control data on the image sensors 22-1 and 22-2, and various types of sensor data or the like outputted from the gyro sensor 23, the acceleration sensor 24, the position sensor 25, and the atmospheric pressure sensor 26 are transmitted by the I3C because of a small amount of the individual data to be transferred.

Further, the AP 31 is able to mutually compensate weak points between these sensors to perform processing (hereinafter, referred to as sensor fusion processing) of integrating respective pieces of sensor data and image data. This enables the AP 31 to achieve a higher degree of processing that avoids collisions with an obstacle.

Incidentally, in order for the AP 31 to perform the sensor fusion processing, data to be integrated needs to be sampled at the same timing, and an output control needs to be performed to allow such data to be appropriately outputted. In addition, it is required to achieve the output control without providing a signal line for transmission of a synchronization signal from the outside as described above.

Therefore, the communication system 11 utilizes time synchronization defined in the I3C to achieve an appropriate output control for a plurality of sensors.

<First Processing Example of Output Control Based on Time Synchronization>

Description is given, with reference to FIGS. 2 to 6, of an output control for pieces of data passing through different transmission paths as a first processing example of an output control based on time synchronization.

Figure 2:
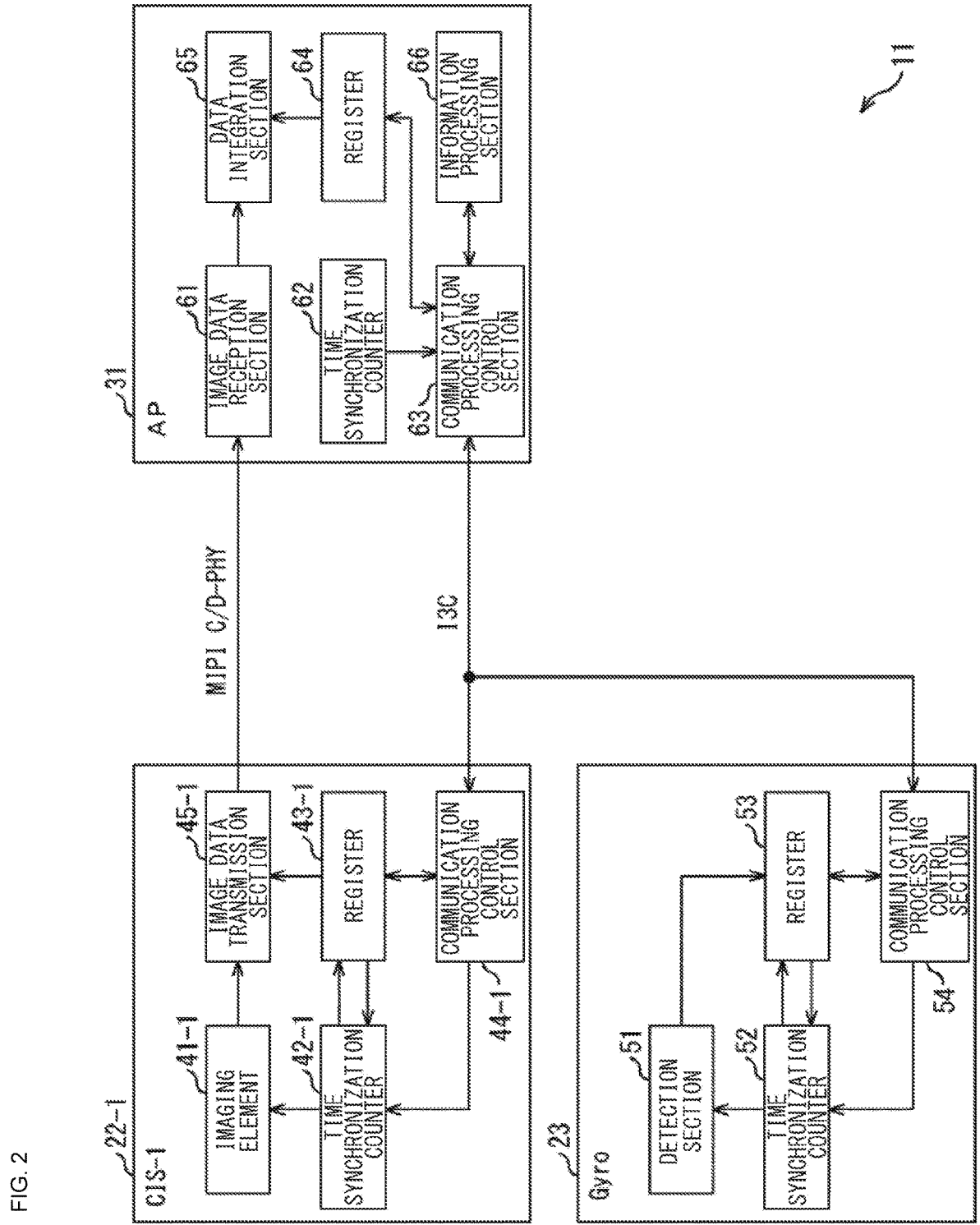
FIG. 2 is a block diagram of a communication system for describing a first processing sample of an output control based on time synchronization.

In the communication system 11 illustrated in FIG. 2, the image sensor 22-1, the gyro sensor 23, and the AP 31 are illustrated, which are used to describe the first processing example of the output control based on time synchronization, among each of the blocks included in the communication system 11 illustrated in FIG. 1. That is, the output control based on time synchronization is performed on the image data transmitted from the image sensor 22-1 to the AP 31 by the C-PHY or the D-PHY, and for the angular velocity data transmitted from the gyro sensor 23 to the AP 31 by the I3C.

The image sensor 22-1 includes an imaging element 41-1, a time synchronization counter 42-1, a register 43-1, a communication processing control section 44-1, and an image data transmission section 45-1.

The imaging element 41-1 performs imaging using light focused on an imaging plane through an unillustrated optical system to supply the image data obtained as a result of the imaging to the image data transmission section 45-1. For example, in accordance with a count value by the time synchronization counter 42-1, the imaging element 41-1 starts imaging at a predetermined sampling cycle, and outputs image data (AD conversion).

The time synchronization counter 42-1 counts a count value at a predetermined clock frequency in order to achieve the timing control defined in the I3C.

The register 43-1 retains set values such as delay time and a sampling cycle and count values indicating imaging time data, which are described later.

The communication processing control section 44-1 performs communication processing which is controlled in a leading manner by a communication processing control section 63 of the AP 31 in accordance with the I3C. For example, the communication processing control section 44-1 receives the set values such as delay time and a sampling cycle transmitted from the AP 31 to cause the register 43-1 to retain the received set values.

The image data transmission section 45-1 transmits image data supplied from the image sensor 22-1 to the AP 31 in accordance with the C-PHY or the D-PHY. At this time, the image data transmission section 45-1 is able to read the imaging time data from the register 43-1 to transmit image data storing the imaging time data, as described later.

The gyro sensor 23 includes a detection section 51, a time synchronization counter 52, a register 53, and a communication processing control section 54.

The detection section 51 detects an angular velocity at a predetermined sampling cycle in accordance with a count value of the time synchronization counter 42-1 to cause the register 53 to retain the angular velocity data.

The time synchronization counter 52 counts a count value at a predetermined clock frequency in order to achieve the timing control defined in the I3C.

The register 53 retains set values such as delay time and a sampling cycle, count values indicating sampling time data, and angular velocity data, which are described later.

The communication processing control section 54 performs communication processing to be controlled in a leading manner by the communication processing control section 63 of the AP 31 in accordance with the I3C. For example, the communication processing control section 54 receives the set values such as delay time and a sampling cycle transmitted from the AP 31 to cause the register 43-1 to retain the received set values, and reads the sampling time data and the angular velocity data from the register 53 for transmission to the AP 31.

The AP 31 includes an image data reception section 61, a time synchronization counter 62, the communication processing control section 63, a register 64, a data integration section 65, and an information processing section 66.

The image data reception section 61 receives image data storing the imaging time data, which is transmitted from the image data transmission section 45-1 of the image sensor 22-1 in accordance with the C-PHY or the D-PHY to supply the received image data to the data integration section 65.

The time synchronization counter 62 counts a count value at a predetermined clock frequency in order to achieve the timing control defined in the I3C.

In accordance with the I3C, the communication processing control section 63 controls communication processing in a leading manner between the communication processing control section 44-1 of the image sensor 22-1 and the communication processing control section 54 of the gyro sensor 23. For example, the communication processing control section 63 transmits the set values such as delay time and a sampling cycle supplied from the information processing section 66 to the image sensor 22-1 and the gyro sensor 23. In addition, the communication processing control section 63 performs read processing on the gyro sensor 23 to receive the sampling time data and the angular velocity data transmitted from the gyro sensor 23 to cause the register 64 to retain the received data.

The register 64 retains the sampling time data and the angular velocity data supplied from the communication processing control section 63.

The data integration section 65 refers to the imaging time data of the image data supplied from the image data reception section 61 to read the angular velocity data of the sampling time data indicating the same timing from the register 64. Then, the data integration section 65 conducts the sensor fusion processing to integrate these pieces of data, e.g., such sensor fusion processing as to correct image distortion in accordance with the attitude of the drone determined from the angular velocity. It is to be noted that image data having been subjected to the sensor fusion processing of the data integration section 65 is used, for example, for a flight control processing section (unillustrated) of a subsequent stage to control flight of the drone.

The information processing section 66 acquires a frequency and an error of the time synchronization counter 42-1 of the image sensor 22-1 as well as a frequency and an error of the time synchronization counter 52 of the gyro sensor 23 via the communication processing control section 63. Then, the information processing section 66 sets delay time and a sampling cycle for the image sensor 22-1 in accordance with the frequency of the time synchronization counter 42-1 for transmission of set values thereof. Likewise, the information processing section 66 sets delay time and a sampling cycle for the gyro sensor 23 in accordance with the frequency of the time synchronization counter 52 for transmission of set values thereof. Further, on the basis of the errors of the time synchronization counter 42-1 and the time synchronization counter 52, the information processing section 66 sets a predetermined timing before a timing at which synchronization is assumed to be lost due to the errors being cumulated, as a synchronization maintenance timing to maintain the synchronization again.

Figure 3:
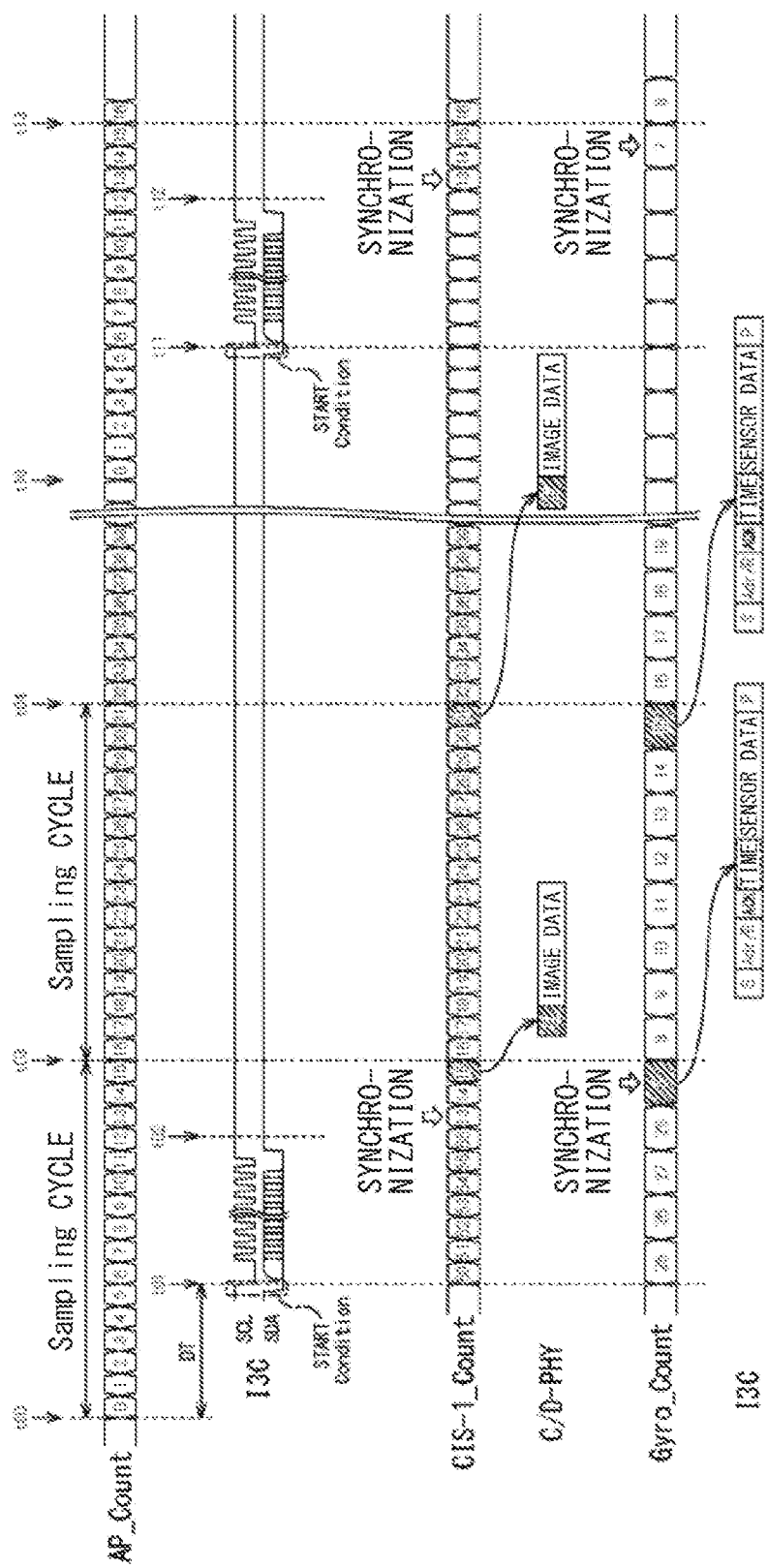
FIG. 3 describes an operation of a first processing example.

Description is given, with reference to FIG. 3, of the operation of the output control based on the time synchronization performed between the AP 31 and each of the image sensor 22-1 and the gyro sensor 23.

In the operation example illustrated in FIG. 3, the time synchronization counter 42-1 of the image sensor 22-1 operates at the same clock frequency as the time synchronization counter 62 of the AP 31, and the time synchronization counter 52 of the gyro sensor 23 operates at half the clock frequency of the time synchronization counter 62 of the AP 31. It is to be noted that description is given, in each of the above, without considering phase shifting.

First, in the AP 31, the time synchronization counter 62 starts counting with time t00 as the original point. In addition, sampling cycle is set so that 16 counts by the time synchronization counter 62 of the AP 31 becomes one cycle.

Then, in the AP 31, the communication processing control section 63 outputs a start condition indicating the start of communication in accordance with the I3C at time t01 of a timing corresponding to predetermined delay time (DT=6 in the example of FIG. 3) from the time t00. For example, the communication processing control section 63 switches a serial clock SCL from one to zero in a state where serial data SDA is zero to thereby output the start condition.

Then, following the output of the start condition, the communication processing control section 63 transmits an ST message (SETXTIME CCC with ST Sub-Command) instructing the start of a time-synchronized operation in accordance with the I3C. Here, the delay time is a delay value from setting of the time t00 at the time synchronization counter 62 to input of the ST message to an I3C terminal of the gyro sensor 23 and the image sensor 22-1.

Meanwhile, in the image sensor 22-1, when detecting that the start condition has been outputted, the communication processing control section 44-1 notifies the time synchronization counter 42-1 of the detection of the start condition. In response to this notification, the time synchronization counter 42-1 supplies the register 43-1 with a count value (CIS-1_Count=50 in the example of FIG. 3) at the time t01 at which the detection of the start condition has been notified, and causes the register 43-1 to retain the count value.

Likewise, in the gyro sensor 23, when detecting that the start condition has been outputted, the communication processing control section 54 notifies the time synchronization counter 52 of the detection of the start condition. In response to this notification, the time synchronization counter 52 supplies the register 53 with a count value (Gyro_Count=25 in the example of FIG. 3) at the time t01 at which the detection of the start condition has been notified, and causes the register 53 to retain the count value.

Thereafter, at time t02, in the image sensor 22-1, when receiving the ST message, the communication processing control section 44-1 notifies the time synchronization counter 42-1 of detection of the ST message. Then, in response to the ST message, the time synchronization counter 42-1 calculates a count value to be newly set on the basis of a count value at the time t02 (CIS-1_Count=56 in the example of FIG. 3), a count value at the time t01 (CIS-1_Count=50 in the example of FIG. 3) retained by the register 43-1, and the delay time. It is to be noted that the image sensor 22-1 has the same clock frequency as the AP 31 and the delay time is six.

For example, the time synchronization counter 42-1 adds the delay time to a difference obtained by subtracting the count value at the time t02 from the count value at the time t01 retained by the register 43-1 to calculate an incremented (+1) count value (13=(56−50)+6+1) to be set as a value of the next count timing. This allows the original points of the time synchronization counter 42-1 of the image sensor 22-1 and the time synchronization counter 62 of the AP 31 to coincide with each other, thus making it possible to achieve time synchronization.

Likewise, at the time t02, in the gyro sensor 23, when receiving the ST message, the communication processing control section 54 notifies the time synchronization counter 52 of detection of the ST message. Then, in response to the ST message, the time synchronization counter 52 calculates a count value to be newly set on the basis of a count value at the time t02 (Gyro_Count=28 in the example of FIG. 3), a count value at the time t01 (Gyro_Count=25 in the example of FIG. 3) retained by the register 53, and the delay time. It is to be noted that the gyro sensor 23 has half the clock frequency of the AP 31 and the delay time is three.

For example, the time synchronization counter 52 adds the delay time to a difference obtained by subtracting the count value at the time t02 from the count value at the time t01 retained by the register 53 to calculate an incremented (+1) count value (7=(28−25)+3+1) to be set as a value of the next count timing. This allows the original points of the time synchronization counter 52 of the gyro sensor 23 and the time synchronization counter 62 of the AP 31 to coincide with each other, thus making it possible to achieve time synchronization.

Subsequently, at time t03, in the image sensor 22-1, the imaging element 41-1 outputs image data acquired by performing imaging to the image data transmission section 45-1 in accordance with the sampling cycle. At this time, the time synchronization counter 42-1 supplies the register 43-1 with a count value at the time t03 (CIS-1_Count=15 in the example of FIG. 3) as imaging time data to cause the register 43-1 to retain the count value.

Figure 4:
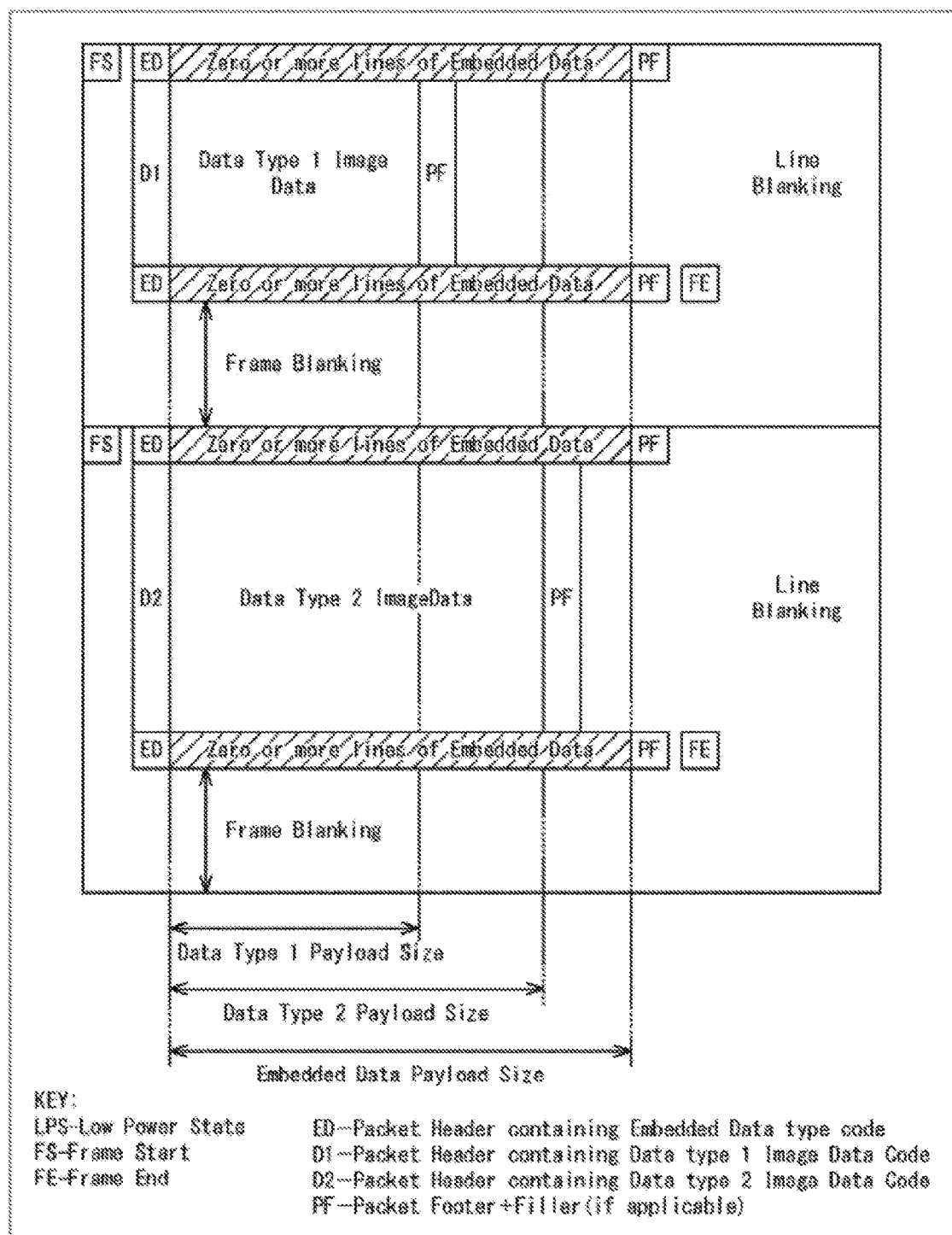
FIG. 4 illustrates a structure of an Embedded Data Packet.

Thereafter, in the image sensor 22-1, the image data transmission section 45-1 reads imaging time data from the register 43-1 to store the imaging time data in Embedded Data Packet of the CSI-2. Then, the image data transmission section 45-1 transmits image data storing the imaging time data (CIS-1_Count=15 in the example of FIG. 3) to the AP 31 in accordance with the C-PHY or the D-PHY. Here, Embedded Data Packet is disposed at a hatched location as illustrated in FIG. 4, and is defined, in the CSI-2 standard, as being able to store any data. It is to be noted that the transmission of the imaging time data from the image sensor 22-1 to the AP 31 is not limited to the method of storing in Embedded Data Packet of the CSI-2 as described above; another method may also be employed. For example, a method may also be employed in which the imaging time data may be stored in another packet or may be stored in a packet header (D1 or D2 illustrated in FIG. 4) of the image data.

Likewise, at the time t03, in the gyro sensor 23, the detection section 51 writes the angular velocity data acquired by detection of the angular velocity into the register 53 in accordance with the sampling cycle. At this time, the time synchronization counter 52 supplies the register 53 with a count value at the time t03 (Gyro_Count=7 in the example of FIG. 3) to cause the register 53 to retain the count value. It is to be noted that data, in the register 53, the angular velocity data and the sample time data are arranged at adjacent addresses. This enables burst reading in the I3C when the communication processing control section 54 reads the angular velocity data and the sampling time data from the register 53.

Thereafter, in the gyro sensor 23, the communication processing control section 54 reads the angular velocity data and the sampling time data from the register 53 in response to a read request made by the communication processing control section 63 of the AP 31 in accordance with the I3C. Then, the communication processing control section 54 transmits the angular velocity data and the sample time data (Gyro_Count=7 in the example of FIG. 3) to the AP 31 in accordance with the I3C.

Hereinafter, similar processing is performed repeatedly in accordance with the sampling cycle, and at time t04, for example, imaging is performed by the imaging element 41-1, and detection of the angular velocity is performed by the detection section 51. Then, image data in which the imaging time data, which is a count value at the time t04 (CIS-1_Count=31 in the example of FIG. 3), is stored in Embedded Data Packet of the CSI-2 is transmitted from the image sensor 22-1 to the AP 31 in accordance with the C-PHY or the D-PHY. Likewise, sampling time data, which is a count value at the time t04 (Gyro_Count=15 in the example of FIG. 3), is transmitted together with the angular velocity data from the gyro sensor 23 to the AP 31 in accordance with the I3C.

At this time, there is a case where a timing at which the image sensor 22-1 outputs image data and a timing at which the gyro sensor 23 outputs the angular velocity data may precede or succeed each other. That is, in the example illustrated in FIG. 3, the image data captured at the time t03 is outputted prior to the angular velocity data acquired at the time t03, and the image data captured at the time t04 is outputted after the angular velocity data acquired at the time t04. Even in a case where such data overtaking occurs, the imaging time data and the sampling time data are time synchronized in the communication system 11, thus enabling the AP 31 to extract the image data and the angular velocity data sampled at the same timing and to perform the sensor fusion processing.

Incidentally, cumulation of the errors of the time synchronization counter 42-1 and the time synchronization counter 52 is assumed to lead to loss of synchronization, even in a case where time synchronization is performed with the time t00 as the original point. Therefore, in the communication system 11, at a synchronization maintenance timing before the synchronization is assumed to be lost, the AP 31 is able to newly maintain time synchronization by re-outputting the start condition and retransmitting the ST message.

For example, as illustrated in FIG. 3, in a case where it is the synchronization maintenance timing at time t10, in the AP 31, the communication processing control section 63 re-outputs the start condition indicating the start of communication in accordance with the I3C at time t11 corresponding to predetermined delay time from the time t10, and retransmits the ST message. Thus, similarly to those described above, at time t12, a count value to be newly set is calculated in the image sensor 22-1 and the gyro sensor 23, and time synchronization is performed with the time t10 as the original point. Thereafter, at time t13 in accordance with the sampling cycle, image data is acquired in the image sensor 22-1, and the angular velocity data is acquired in the gyro sensor 23; hereinafter, similar processing is performed repeatedly.

It is to be noted that, typically, a counter is implemented that makes one turn in a sampling cycle (count values of 0 to 15 in the example illustrated in FIG. 3); however, in this configuration, count values are such that the sampling time for each sampling cycle is the same, thus making it unable to recognize that the data overtaking as described above has occurred. Therefore, in the communication system 11, the time synchronization counter 42-1, the time synchronization counter 52, and the time synchronization counter 62 are implemented, that make one turn in two or more cycles of the sampling cycle at lowest. This makes it possible to recognize that the data overtaking has occurred, because count values are such that the sampling time varies at least in the consecutive sampling cycles.

Figure 5:
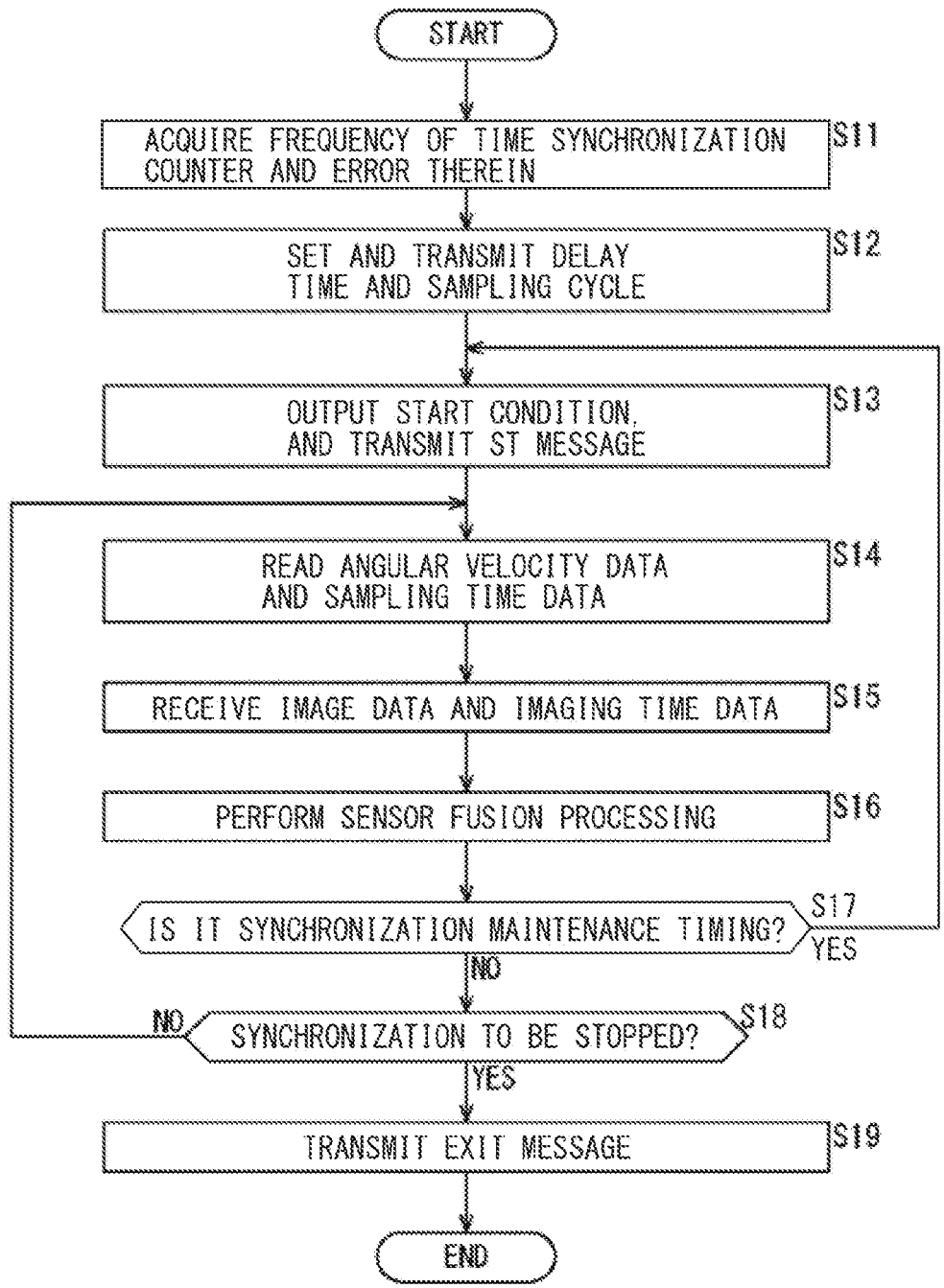
FIG. 5 is a flowchart describing output control processing based on time synchronization to be performed in an AP.

FIG. 5 is a flowchart describing output control processing based on the time synchronization to be performed in the AP 31.

For example, processing is started when the communication system 11 is activated. In step S11, the information processing section 66 acquires a frequency and an error of the time synchronization counter 42-1 of the image sensor 22-1 as well as a frequency and an error of the time synchronization counter 52 of the gyro sensor 23, via the communication processing control section 63.

In step S12, the information processing section 66 sets delay time and a sampling cycle in line with the frequency of the time synchronization counter 42-1 of the image sensor 22-1 acquired in step S11 to transmit them to the image sensor 22-1 via the communication processing control section 63. Likewise, the information processing section 66 sets delay time and a sampling cycle in line with the frequency of the time synchronization counter 52 of the gyro sensor 23 acquired in step S11 to transmit them to the gyro sensor 23 via the communication processing control section 63.

In step S13, the communication processing control section 63 outputs a start condition in accordance with the I3C, and transmits the ST message instructing the start of a time-synchronized operation. In response thereto, the image sensor 22-1 and the gyro sensor 23 perform time synchronization with the time synchronization counter 62 of the AP 31 as described above with reference to FIG. 3. Then, at a timing in accordance with the time-synchronized sampling cycle, imaging is started in the image sensor 22-1, and detection of the angular velocity is started in the gyro sensor 23.

In step S14, the communication processing control section 63 makes a read request in accordance with the I3C, reads the angular velocity data and the sampling time data from the gyro sensor 23, and stores the read data in the register 64.

In step S15, the image data reception section 61 receives image data transmitted from the image sensor 22-1 in accordance with the C-PHY or the D-PHY, and supplies the received image data to the data integration section 65. At this time, the image data reception section 61 acquires the imaging time data stored in Embedded Data Packet of the CSI-2, and supplies the acquired data to the data integration section 65.

In step S16, the data integration section 65 reads, from the register 64, the angular velocity data of the sampling time data indicating the same timing as the imaging time data of the image data supplied in step S15, and performs the sensor fusion processing to integrate the pieces of data. That is, the data integration section 65 compares the imaging time data of the image data received through the C-PHY or the D-PHY and the sampling time data of the angular velocity data received through the I3C with each other, and performs the sensor fusion processing such as correction of image distortion in accordance with the attitude of the drone obtained from the angular velocity depending in response to the time thereof.

In step S17, the information processing section 66 determines whether or not it is a synchronization maintenance timing set from the error acquired in step S11. For example, on the basis of the error of the time synchronization counter 42-1 of the image sensor 22-1 and the error of the time synchronization counter 52 of the gyro sensor 23, the information processing section 66 is able to set, in advance, as a synchronization maintenance timing, a predetermined timing before a timing at which synchronization is assumed to be lost due to those errors being cumulated.

In step S17, in a case where the information processing section 66 determines that it is the synchronization maintenance timing, the processing returns to step S13. That is, in this case, in step S13, the start condition is re-outputted, and the ST message is retransmitted. In response thereto, in the image sensor 22-1 and the gyro sensor 23, time synchronization with the time synchronization counter 62 of the AP 31 is newly maintained as described above with reference to FIG. 3; hereinafter, similar processing is performed repeatedly.

Meanwhile, in a case where determination is made in step S17 that the information processing section 66 is not at the synchronization maintenance timing, the processing proceeds to step S18.

In step S18, the information processing section 66 determines whether or not the synchronization between the image sensor 22-1 and the gyro sensor 23 is stopped.

In step S18, in a case where the information processing section 66 has determined not to stop the synchronization between the image sensor 22-1 and the gyro sensor 23, the processing returns to step S14. That is, in this case, because of not being the synchronization maintenance timing and not stopping the synchronization, the operations of acquiring the image data and the angular velocity data while maintaining the current time synchronization are hereinafter repeatedly performed similarly.

Meanwhile, in step S18, in a case where the information processing section 66 determines that the synchronization between the image sensor 22-1 and the gyro sensor 23 is stopped, the processing proceeds to step S19.

In step S19, the communication processing control section 63 transmits an EXIT message (SETXTIME CCC with ST Sub-Command) instructing end of the time-synchronized operation, and ends the output control processing based on the time synchronization.

Figure 6:
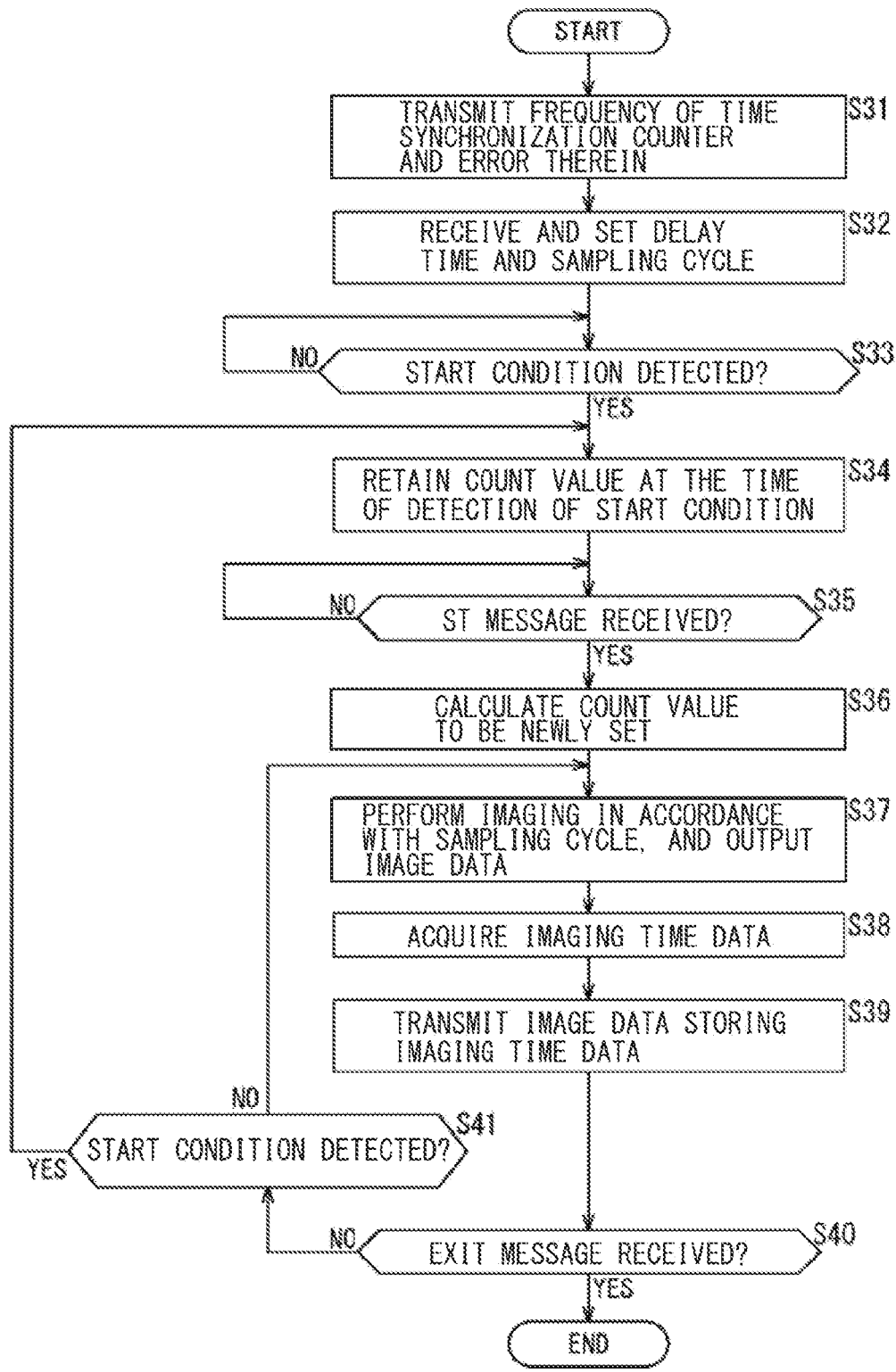
FIG. 6 is a flowchart describing output control processing based on time synchronization to be performed in an image sensor.

A flowchart illustrated in FIG. 6 is a flowchart describing output control processing based on the time synchronization to be performed in the image sensor 22-1.

In step S31, the communication processing control section 44-1 transmits the frequency and the error of the time synchronization counter 42-1 in response to the request from the communication processing control section 63 of the AP 31 (see step S11 in FIG. 5).

In step S32, the communication processing control section 44-1 receives the delay time and the sampling cycle transmitted in step S12 in FIG. 5, and sets them in the register 43-1.

In step S33, the communication processing control section 44-1 determines whether or not the start condition is detected, and waits for the processing until determination is made that the start condition is detected. For example, when the communication processing control section 63 of the AP 31 outputs the start condition in step S13 in FIG. 5, the communication processing control section 44-1 determines that the start condition has been detected, and the processing proceeds to step S34.

In step S34, the communication processing control section 44-1 notifies the time synchronization counter 42-1 of detection of the start condition, and the time synchronization counter 42-1 causes the register 43-1 to retain a count value at the time when the detection of the start condition is notified.

In step S35, the communication processing control section 44-1 determines whether or not an ST message has been received, and waits for processing until determination is made that the ST message has been received. For example, when the communication processing control section 44-1 receives the ST message transmitted by the communication processing control section 63 of the AP 31 in step S13 in FIG. 5, determination is made that the ST message has been received, and the processing proceeds to step S36.

In step S36, the communication processing control section 44-1 notifies the time synchronization counter 42-1 of reception of the ST message, and the time synchronization counter 42-1 calculates a count value to be newly set as described above with reference to FIG. 3. Then, the time synchronization counter 42-1 sets the calculated count value to thereby time synchronize with the time synchronization counter 62 of the AP 31.

In step S37, the imaging element 41-1 performs imaging in accordance with the sampling cycle to output image data acquired by the imaging to the image data transmission section 45-1.

In step S38, the time synchronization counter 42-1 acquires, as the imaging time data, a count value at the timing when the imaging element 41-1 performs imaging in step S37 to cause the register 43-1 to retain the acquired count value.

In step S39, when it is a timing at which the image data is transmitted from the image sensor 22-1, the image data transmission section 45-1 reads, from the register 43-1, the imaging time data of the image data supplied from the imaging element 41-1 in step S37. Then, the image data transmission section 45-1 transmits the image data storing the imaging time data to the AP 31 in accordance with the C-PHY or the D-PHY.

In step S40, the communication processing control section 44-1 determines whether or not the EXIT message has been received. For example, when the EXIT message transmitted by the communication processing control section 63 of the AP 31 is received in step S19 in FIG. 5, the communication processing control section 44-1 is able to determine that the EXIT message has been received.

In a case where determination is made, in step S40, that the communication processing control section 44-1 has not received the EXIT messages, the processing proceeds to step S41.

In step S41, the communication processing control section 44-1 determines whether or not the start condition has been detected. For example, when the start condition is re-outputted in step S13 after the determination is made in step S17 in FIG. 5 that it is the synchronization maintenance timing, the communication processing control section 44-1 is able to determine that the start condition has been detected.

In a case where the communication processing control section 44-1 determines in step S41 that the start condition has been detected, the processing returns to step S34. That is, in this case, as described above with reference to FIG. 3, the time synchronization with the time synchronization counter 62 of the AP 31 is newly maintained, and thereafter similar processing is repeatedly performed.

Meanwhile, in a case where the communication processing control section 44-1 determines, in step S41, that the start condition has not been detected, the processing returns to the step S37, and hereinafter the operation of transmitting image data while maintaining the current time synchronization is repeatedly performed similarly.

Meanwhile, in a case where the communication processing control section 44-1 determines, in step S40, that the EXIT message has been received, the output control processing based on the time synchronization is ended.

Figure 7:
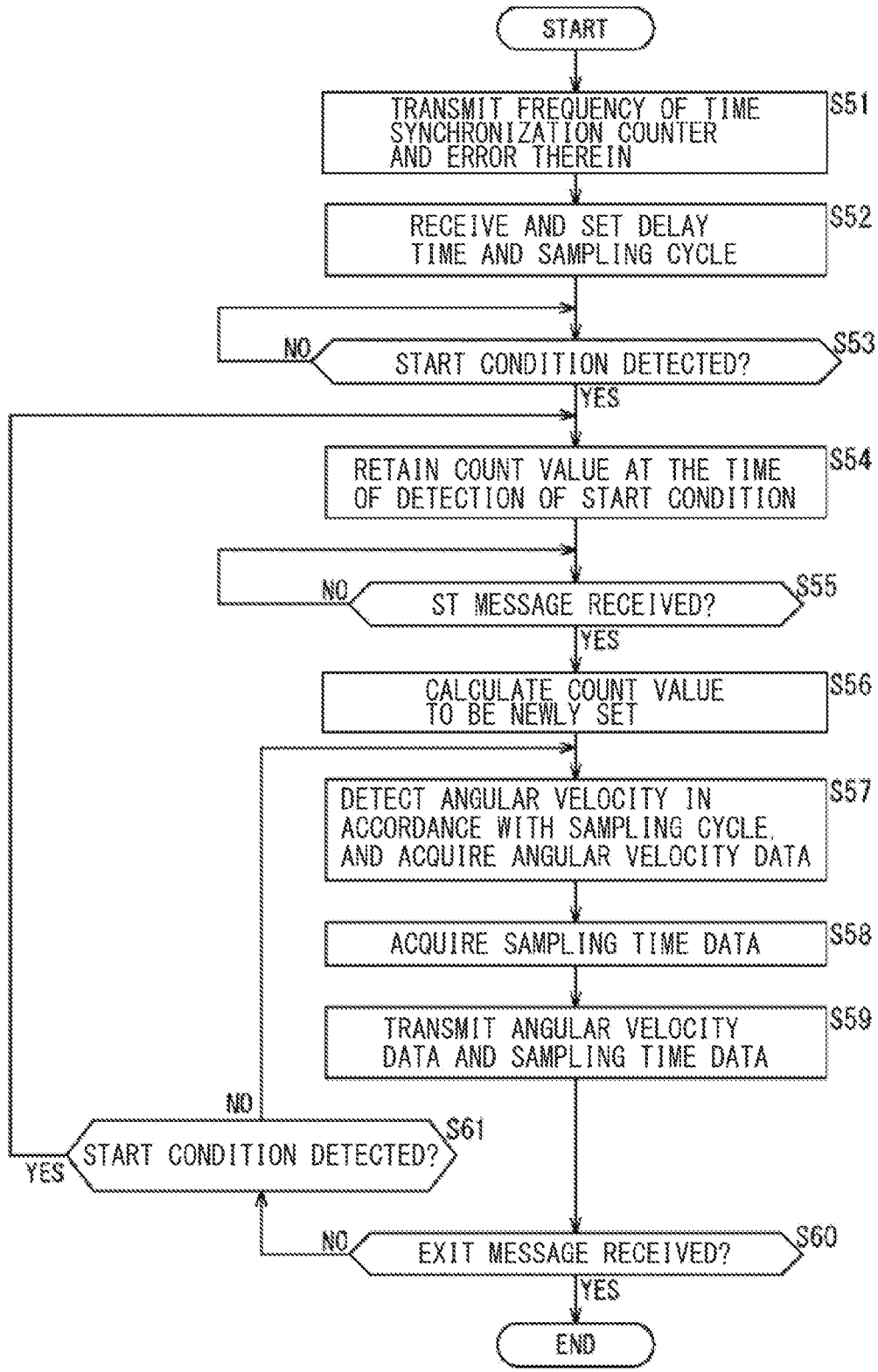
FIG. 7 is a flowchart describing output control processing based on time synchronization to be performed in a gyro sensor.

FIG. 7 is a flowchart describing processing involving the time synchronization to be performed in the gyro sensor 23.

In steps S51 to S56, pieces of processing similar to those in steps S31 to S36 in FIG. 6 are performed. Then, in step S56, the time synchronization counter 52 calculates a count value to be newly set to thereby time synchronize with the time synchronization counter 62 of the AP 31.

In step S57, the detection section 51 detects angular velocity in accordance with the sampling cycle, and writes angular velocity data acquired by the detection into the register 53.

In step S58, the time synchronization counter 52 acquires, as the sampling time data, a count value at a timing at which the detection section 51 detects the angular velocity in step S57, and writes the sampling time data into the register 53 at addresses adjacent to the angular velocity data.

In step S59, in response to the read request in accordance with the I3C made by the communication processing control section 63 of the AP 31 in step S14 in FIG. 5, for example, the communication processing control section 54 reads the angular velocity data and the sampling time data from the register 53 to transmit the read data to the AP 31.

Thereafter, in steps S60 and S61, pieces of processing similar to those in steps S40 and S41 in FIG. 6 are performed.

As described above, in the communication system 11 even having a configuration in which the image data and the angular velocity data are transmitted through different transmission paths, it is possible to perform an appropriate output control on the basis of time synchronization utilizing the timing control defined in the I3C.

<Second Processing Example of Output Control Based on Time Synchronization>

Description is given, with reference to FIGS. 8 to 12, of an output control for data passing through the same transmission path, as a second processing example of an output control based on time synchronization.

Figure 8:
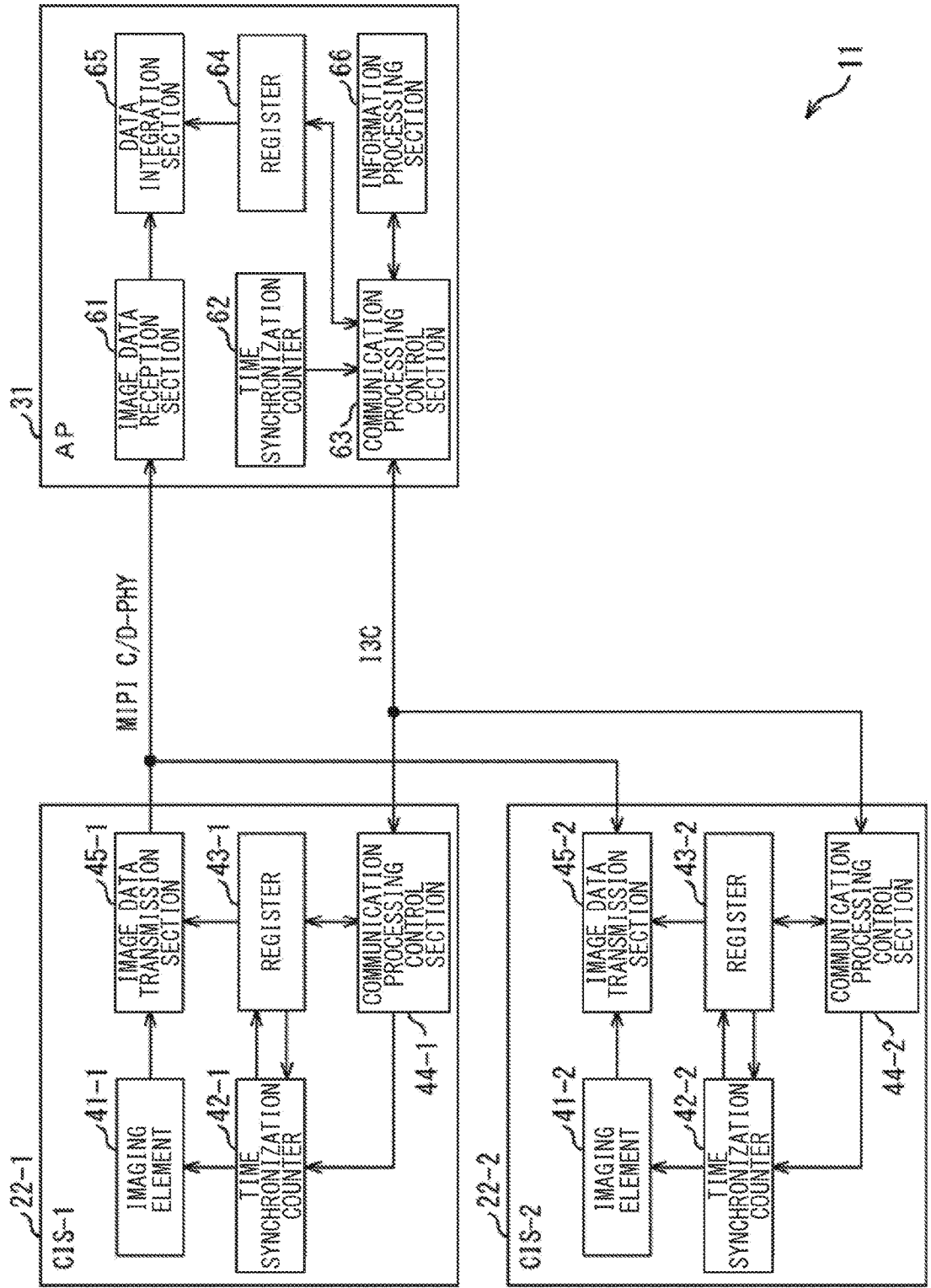
FIG. 8 is a block diagram of a communication system for describing a second processing example of the output control based on time synchronization.

In the communication system 11 illustrated in FIG. 8, the image sensors 22-1 and 22-2 and the AP 31 are illustrated, which are used to describe the second processing example of the output control based on time synchronization, among the blocks included in the communication system 11 illustrated in FIG. 1. That is, the output control based on the time synchronization is performed on each of image data transmitted from the image sensor 22-1 to the AP 31 by the C-PHY or the D-PHY and image data transmitted from the image sensor 22-2 to the AP 31 by the C-PHY or the D-PHY when passing through the same transmission path.

Similarly to those described above with reference to FIG. 2, the image sensor 22-1 includes the imaging element 41-1, the time synchronization counter 42-1, the register 43-1, the communication processing control section 44-1, and the image data transmission section 45-1. In addition, similarly to those described above as to the image sensor 22-1, the image sensor 22-2 includes an imaging element 41-2, a time synchronization counter 42-2, a register 43-2, a communication processing control section 44-2, and an image data transmission section 45-2.

Similarly to those described above with reference to FIG. 2, the AP 31 includes the image data reception section 61, the time synchronization counter 62, the communication processing control section 63, the register 64, the data integration section 65, and the information processing section 66.

Here, in the second processing example of the output control based on the time synchronization, the information processing section 66 of the AP 31 sets an image output timing to instruct a timing to output an image from each of the image sensors 22-1 and 22-2. Then, the information processing section 66 transmits, to the image sensors 22-1 and 22-2, the image output timing together with set values such as delay time and a sampling cycle via the communication processing control section 63.

Then, in the image sensor 22-1, the communication processing control section 44-1 receives the image output timing to cause the register 43-1 to retain the received image output timing. In the image sensor 22-2, the communication processing control section 44-2 receives the image output timing to cause the register 43-2 to retain the received image output timing.

Accordingly, in the image sensor 22-1, the image data transmission section 45-1 is able to transmit image data storing the imaging time data to the AP 31 in accordance with the C-PHY or the D-PHY on the basis of the image output timing retained by the register 43-1. Likewise, in the image sensor 22-2, the image data transmission section 45-2 is able to transmit image data storing the imaging time data to the AP 31 in accordance with the C-PHY or the D-PHY on the basis of the image output timing retained by the register 43-2.

This enables the communication system 11, for example, to transmit image data using the same transmission path from the image sensors 22-1 and 22-2 by utilizing a portion of the timing control defined in the I3C, without providing a signal line for transmission of a synchronization signal from the outside.

Figure 9:
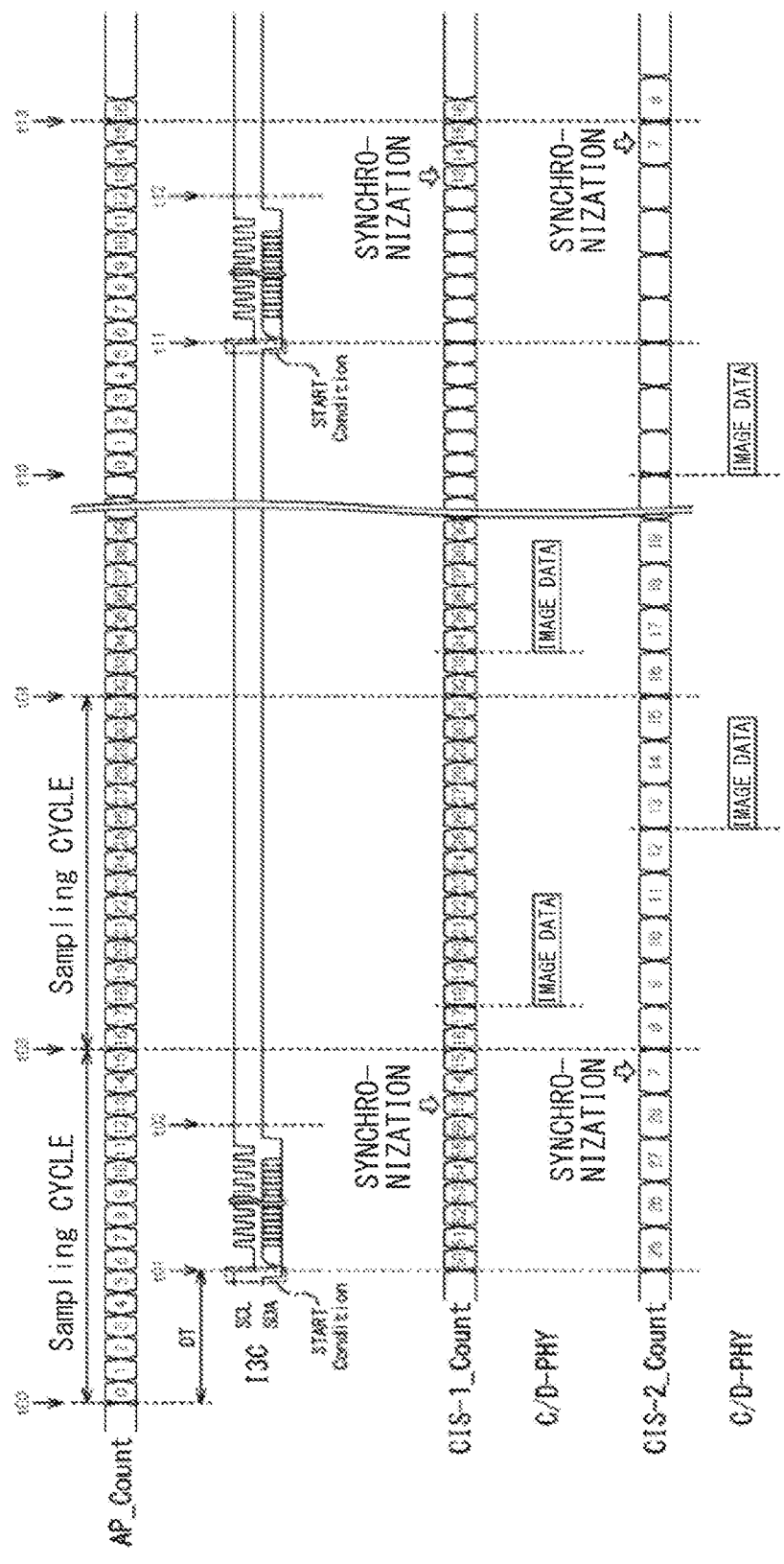
FIG. 9 describes an operation of the second processing example.

Description is given, with reference to FIG. 9, of an operation of the output control based on the time synchronization performed between the AP 31 and each of the image sensors 22-1 and 22-2.

In the operation illustrated in FIG. 9, the time synchronization counter 42-1 of the image sensor 22-1 operates at the same clock frequency as the time synchronization counter 62 of the AP 31, and the time synchronization counter 42-2 of the image sensor 22-2 operates at half the clock frequency of the time synchronization counter 62 of the AP 31. It is to be noted that description is given, in each of the above, without considering phase shifting.

First, in the second processing example of the output control based on the time synchronization, similarly to those described above with reference to FIG. 3, the ST message is transmitted following the output of the start condition, and the time synchronization is performed with the time t00 as the original point.

Then, in the example illustrated in FIG. 9, as for the image output timing of the image sensor 22-1, there is specified a timing two clocks after the timing at which imaging is performed in accordance with the sampling cycle. In addition, as for the image output timing of the image sensor 22-2, there is specified a timing five clocks after the timing at which the imaging is performed in accordance with the sampling cycle.

Accordingly, in the image sensor 22-1, the image data transmission section 45-1 transmits image data storing the imaging time data to the AP 31 in accordance with the C-PHY or the D-PHY at a timing (CIS-1_Count=18 in the example of FIG. 9) two clocks after the time t03 at which the imaging is performed in accordance with the sampling cycle. Likewise, in the image sensor 22-2, the image data transmission section 45-2 transmits image data storing the imaging time data to the AP 31 in accordance with the C-PHY or the D-PHY at a timing (CIS-2_Count=13 in the example of FIG. 9) five clocks after the time t03 at which the imaging is performed in accordance with the sampling cycle.

In this manner, it is possible, in the communication system 11, to avoid collision of signals on a bus, when transmitting image data via the same transmission path by the image output timings for instructing respective different timings.

In addition, also in the second processing example of the output control based on the time synchronization, similarly to those described above with reference to FIG. 3, the AP 31 is able to newly maintain time synchronization by re-outputting the start condition and retransmitting the ST message.

Figure 10:
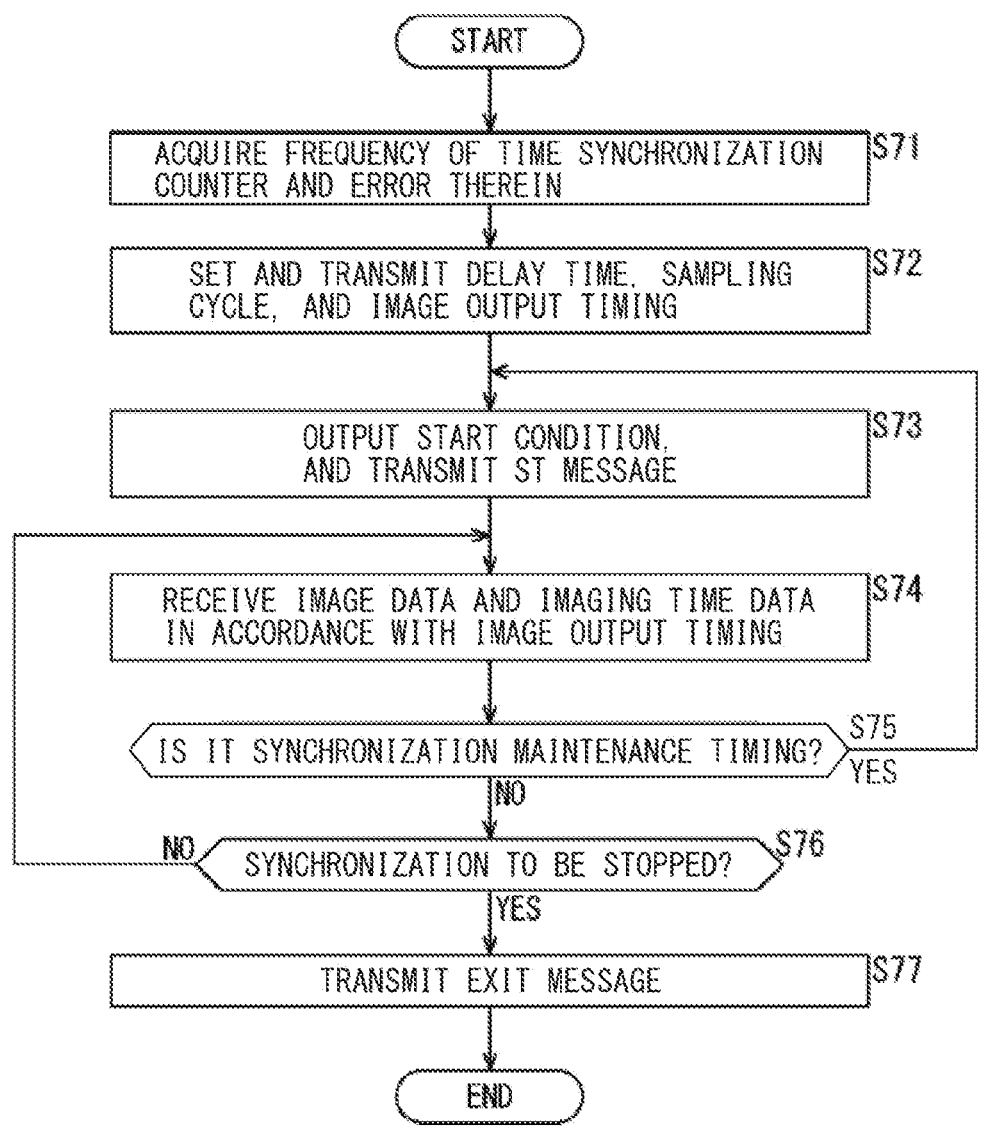
FIG. 10 is a flowchart describing output control processing based on time synchronization to be performed in an AP.

A flowchart illustrated in FIG. 10 is a flowchart describing output control processing based on the time synchronization to be performed in the AP 31.

For example, the processing is started when the communication system 11 is activated. In step S71, the information processing section 66 acquires the frequency and the error of the time synchronization counter 42-1 of the image sensor 22-1 as well as the frequency and the error of the time synchronization counter 42-2 of the image sensor 22-2, via the communication processing control section 63.

In step S72, the information processing section 66 sets delay time, a sampling cycle, and an image output timing in line with the frequency of the time synchronization counter 42-1 of the image sensor 22-1 acquired in step S71 to transmit them to the image sensor 22-1 via the communication processing control section 63. Likewise, the information processing section 66 sets delay time, a sampling cycle, and an image output timing in line with the frequency of the time synchronization counter 42-2 of the image sensor 22-2 acquired in step S71 to transmit them to the image sensor 22-2 via the communication processing control section 63.

In step S73, the communication processing control section 63 outputs a start condition in accordance with the I3C, and transmits the ST message instructing the start of a time-synchronized operation. In response thereto, the image sensors 22-1 and 22-2 perform time synchronization with the time synchronization counter 62 of the AP 31 as illustrated in FIG. 9. Then, at a timing in accordance with the time-synchronized sampling cycle, imaging is started in the image sensors 22-1 and 22-2.

In step S74, the image data reception section 61 receives image data transmitted in response to respective image output timings of the image sensors 22-1 and 22-2 in accordance with the C-PHY or the D-PHY, and supplies the received image data to the data integration section 65. At this time, the image data reception section 61 acquires the imaging time data stored in Embedded Data Packet of the CSI-2, and supplies the acquired data to the data integration section 65.

Thereafter, in steps S75 to S77, pieces of processing similar to those in steps S17 to S19 in FIG. 5 are performed on the image sensors 22-1 and 22-2 as targets.

Figure 11:
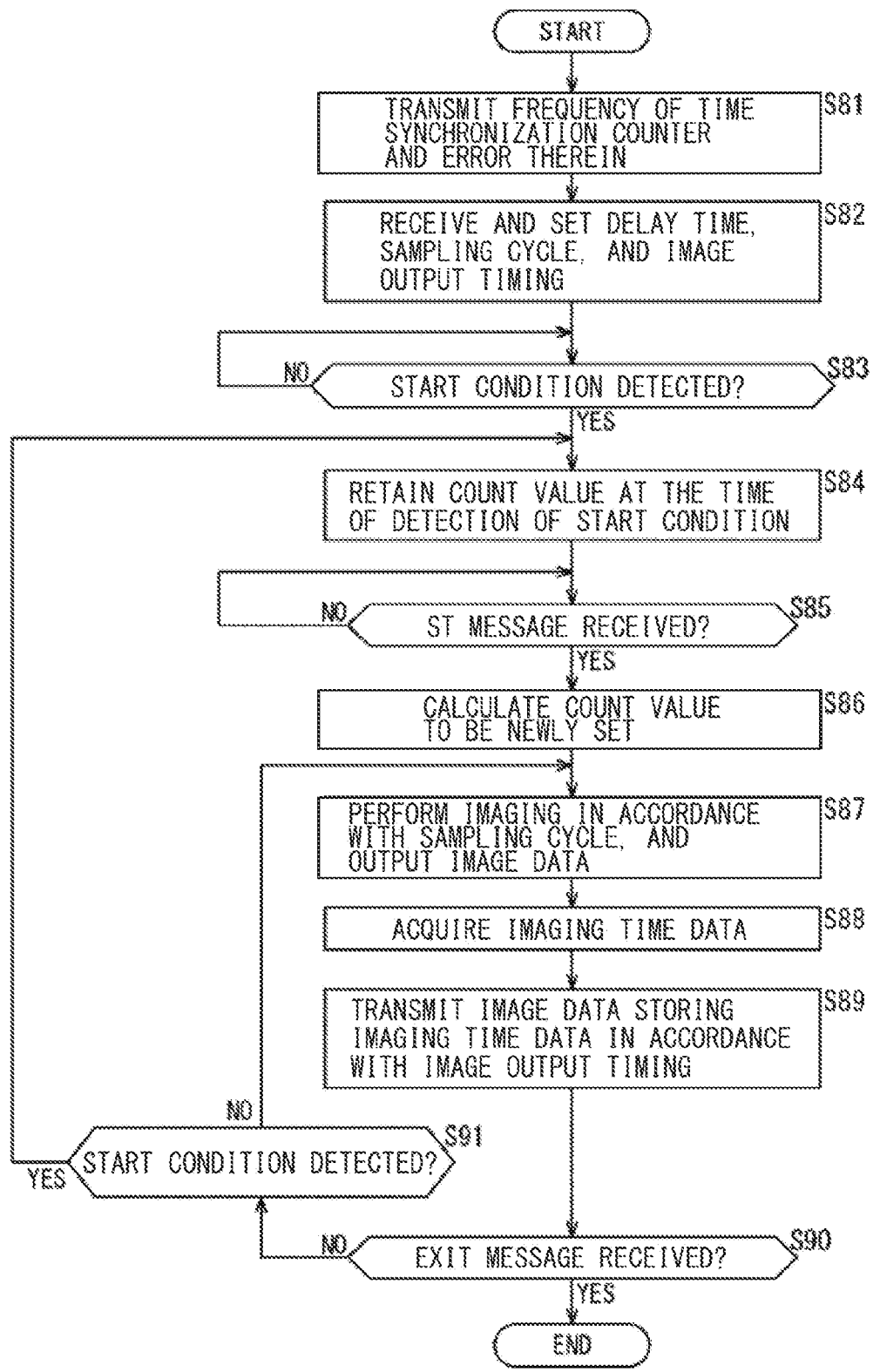
FIG. 11 is a flowchart describing output control processing based on time synchronization to be performed in an image sensor.

FIG. 11 is a flowchart describing output control processing based on time synchronization to be performed in the image sensors 22-1 and 22-2. It is to be noted that, in the image sensors 22-1 and 22-2, similar processing is performed, and thus the image sensors 22-1 and 22-2 are simply referred to below as the image sensor 22 as appropriate; respective components included in the image sensors 22-1 and 22-2 are also referred to similarly.

In step S81, the communication processing control section 44 transmits the frequency and the error of the time synchronization counter 42, in response to a request from the communication processing control section 63 of the AP 31 (see step S71 in FIG. 10).

In step S82, the communication processing control section 44 receives the delay time, the sampling cycle, and the image output timing transmitted in step S72 in FIG. 10, and sets them in the register 43.

Thereafter, in steps S83 to S88, pieces of processing similar to those in steps S33 to S38 in FIG. 6 are performed.

Then, in step S89, the image data transmission section 45 transmits image data storing the imaging time data to the AP 31 in accordance with the C-PHY or the D-PHY on the basis of the image output timing stored in the register 43.

Thereafter, in steps S90 and S91, pieces of processing similar to those in steps S40 and S41 in FIG. 6 are performed.

As described above, in the communication system 11 even having a configuration in which a plurality of pieces of image data are transmitted through the same transmission path, it is possible to perform an appropriate output control on the basis of time synchronization utilizing the timing control defined in the I3C. It is to be noted that, in the communication system 11, the image outputting timing in accordance with the sampling cycle is grasped on side of the AP 31, thus making it possible to recognize the imaging time from the timing at which image data is transmitted, even when the imaging time data is not stored in the image data. That is, in the output control for data passing through the same transmission path, it is not essential to store the imaging time data in the image data. That is, the imaging time data may not necessarily be outputted, and it is only sufficient to perform a control to output image data in accordance with the image output timing.

It is to be noted that it is possible, in the communication system 11, to use two control methods described below as a control method for controlling the image output timing.

Figure 12:
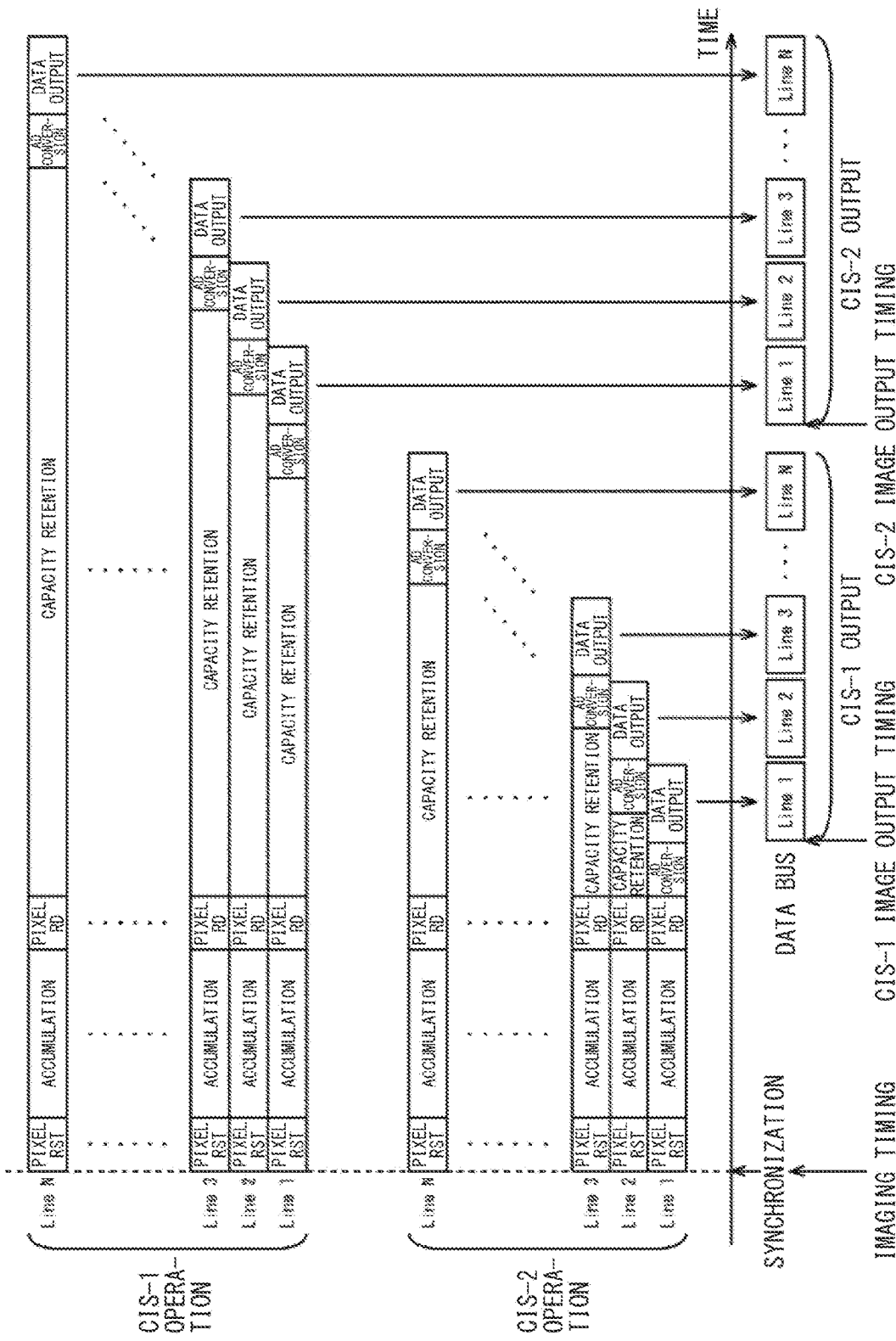
FIG. 12 describes a first control method of controlling an image output timing.

In a first control method, as illustrated in FIG. 12, the individual image sensor 22 calculates and controls a timing to start AD conversion for each line of an image from the specified image output timing to thereby perform an output control to output images continuously.

In a second control method, the individual image sensor 22 performs AD conversion all at once on all lines of the image to store image data in an RAM or the like, and thereafter performs an output control to allow the image data to be outputted in accordance with the specified image output timing.

For example, as compared with the second control method, the first control method has advantages in which the RAM is unnecessary while the output control is complicated, and a configuration of including an AD conversion circuit for one line suffices, thus making it possible to minimize a circuit size. In addition, in the first control method, a timing to start the AD conversion of the first line is specified as the image output timing specified by the AP 31, thereby making it possible to achieve the output control.

As described above, the communication system 11 is able to perform the sensor fusion processing between pieces of data sampled at the same timing even when the data overtaking occurs as described above with reference to FIG. 3. In addition, it is possible for the communication system 11 to have a configuration in which a signal line is unnecessary to transmit a synchronization signal from the outside, and to reduce the number of pins of the AP 31.

Further, the communication system 11 performs the time synchronization by utilizing the timing control defined in the I3C standard, thus making it possible to reliably perform the output control as long as various types of sensors employing the I3C standard are used. In addition, for example, it is only sufficient for the communication system 11 to retransmit the ST message when it is the synchronization maintenance timing, with no need of performing such processing as to transmit the synchronization signal for each sampling cycle, thus making it possible to reduce processing load of the AP 31.

In addition, the communication system 11 performs time synchronization by utilizing the timing control defined in the I3C standard, thus making it possible to eliminate the need of a dedicated synchronization control mechanism to control the image output timing, for example.

It is to be noted that the communication system 11 may be configured to be able to execute only one of the first processing example and the second processing example described above, in addition to the configuration of being able to execute both of them.

<Examples of Implementation of Image Sensor, Gyro Sensor, and AP>

Figure 13:
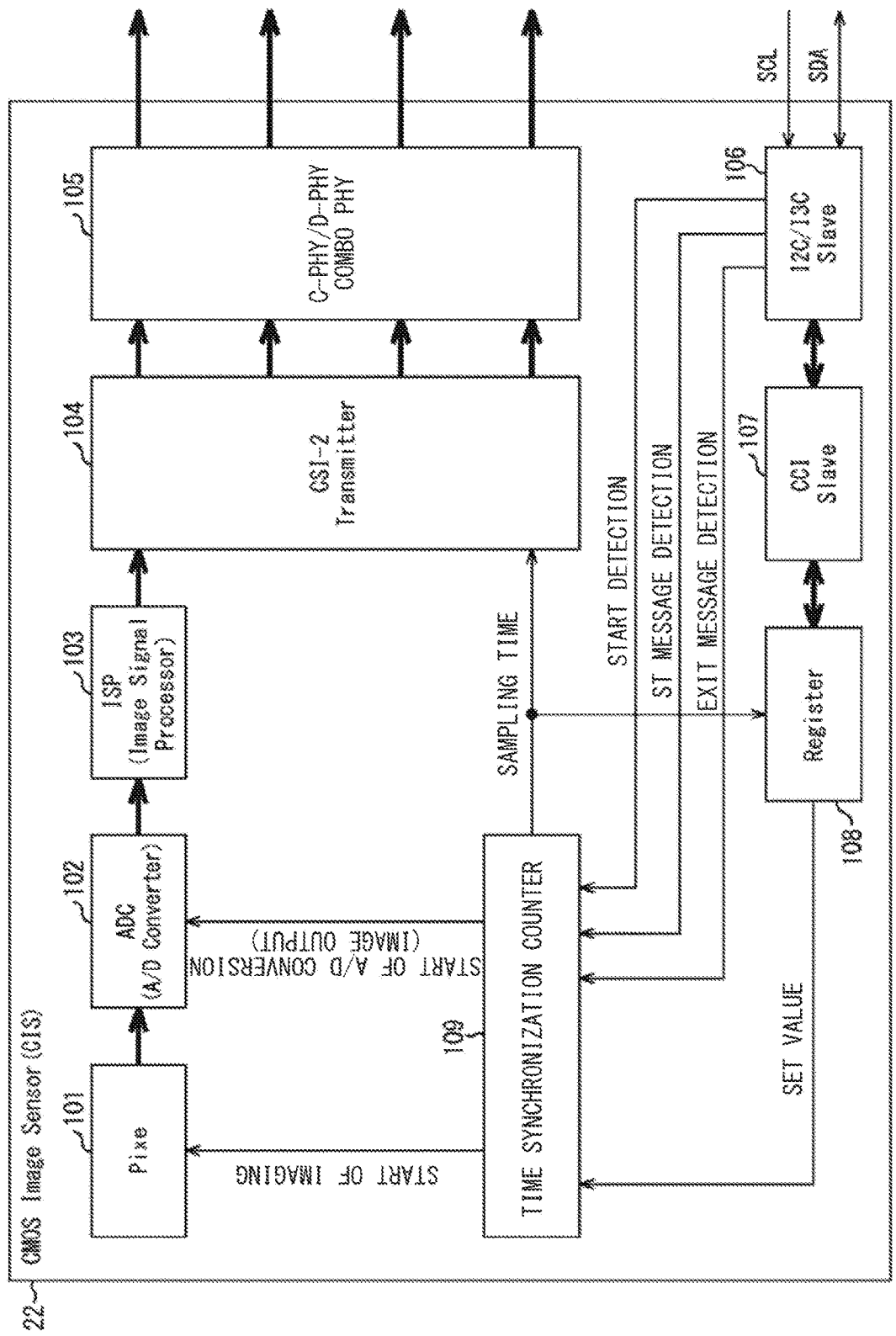
FIG. 13 illustrates an example of implementation of the image sensor.
Figure 14:
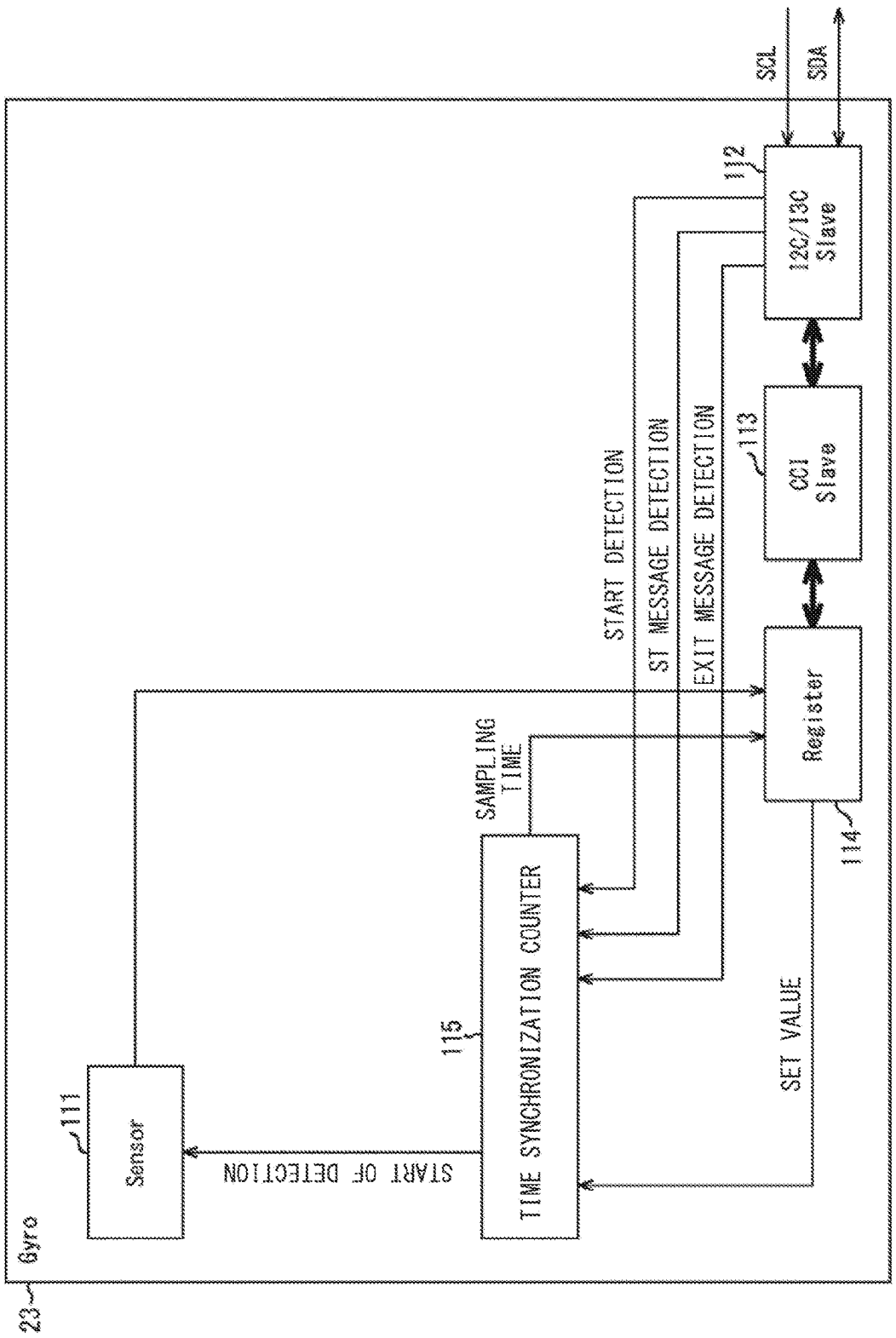
FIG. 14 illustrates an example of implementation of the gyro sensor.
Figure 15:
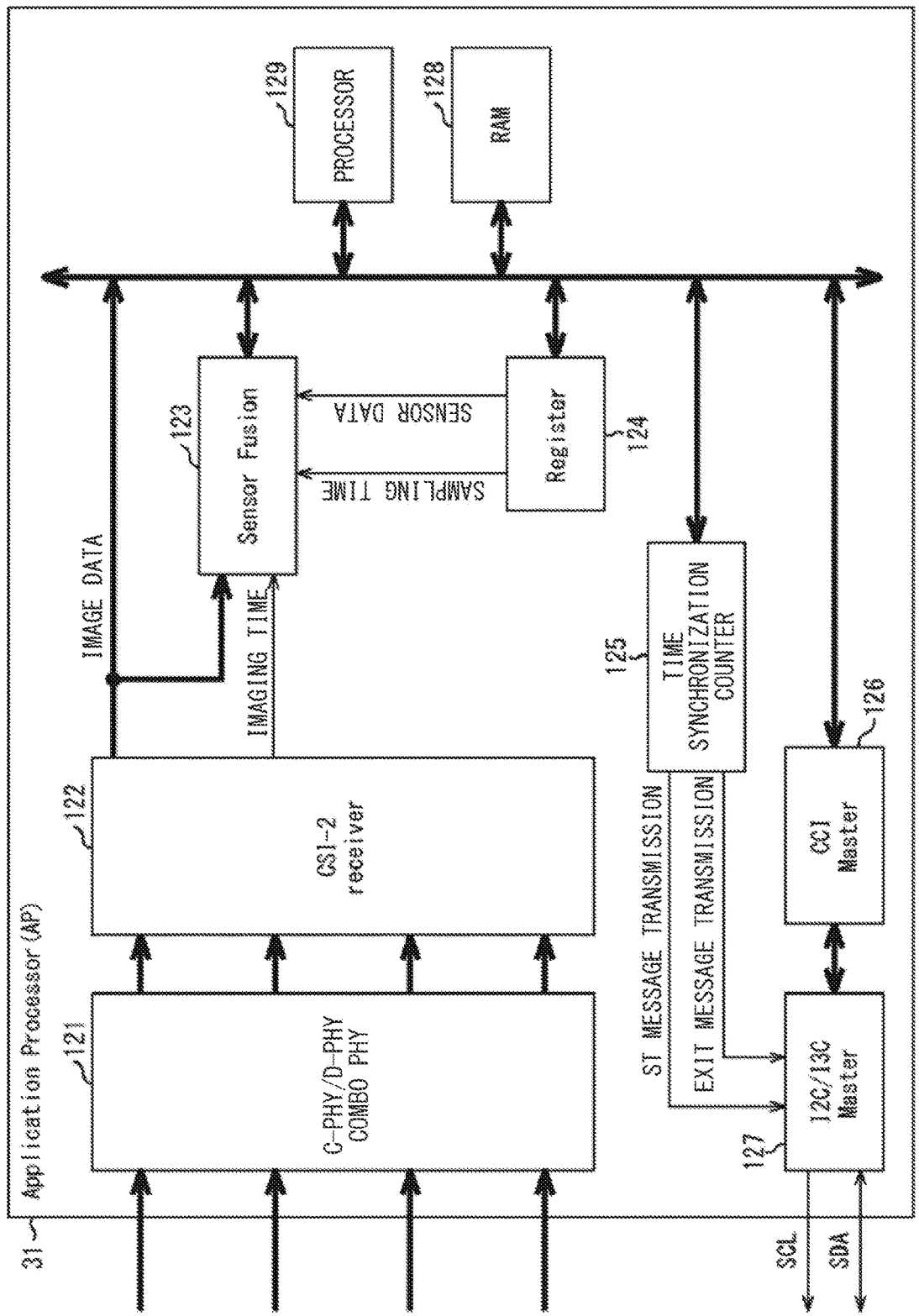
FIG. 15 illustrates an example of implementation of the AP.

Description is given, with reference to FIGS. 13 to 15, of examples of implementation of the image sensor 22, the gyro sensor 23, and the AP 31.

FIG. 13 illustrates an example of implementation of the image sensor 22.

As illustrated in FIG. 13, the image sensor 22 includes a pixel 101, an AD converter 102, an image processing section 103, a CSI-2 transmitter 104, a physical layer processing section 105, an I2C/I3C slave 106, a CCI slave 107, a register 108, and a time synchronization counter 109.

The pixel 101, the AD converter 102, and the image processing section 103 are included in, for example, the imaging element 41-1 in FIG. 2. That is, the pixel 101 outputs a pixel signal corresponding to an amount of received light, and the AD converter 102 converts the pixel signal into a digital value to supply the converted digital value to the image processing section 103. Then, the image processing section 103 supplies the CSI-2 transmitter 104 with image data obtained by performing image processing to construct an image from the pixel signal.

The CSI-2 transmitter 104 and the physical layer processing section 105 are included in, for example, the image data transmission section 45-1 in FIG. 2. That is, the CSI-2 transmitter 104 transmits the image data supplied from the image processing section 103 in accordance with the CSI-2, and the physical layer processing section 105 transmits the image data to the AP 31 in accordance with the C-PHY or the D-PHY.

The I2C/I3C slave 106 and the CCI (Camera Control Interface) slave 107 are included in, for example, the communication processing control section 44-1 in FIG. 2. That is, the I2C/I3C slave 106 performs communication processing in accordance with the I2C or the I3C, which is controlled in a leading manner by an I2C/I3C master 127 of the AP 31, and the CCI slave 107 performs communication processing in accordance with the CCI, which is controlled in a leading manner by a CCI master 126 of the AP 31. For example, the I2C/I3C slave 106 notifies the time synchronization counter 109 of detection of the start condition, detection of the ST message, and detection of the EXIT message The register 108 corresponds to the register 43-1 in FIG. 2. That is, set values such as delay time, a sampling cycle, and an image output timing are written into the register 108 via the I2C/I3C slave 106 and the CCI slave 107. In addition, the register 108 retains the imaging time data (sample time) outputted from the time synchronization counter 109, and the imaging time data is read by the CSI-2 transmitter 104.

The time synchronization counter 109 corresponds to the time synchronization counter 42-1 in FIG. 2. That is, the time synchronization counter 109 reads the set values such as the delay time, the sampling cycle, and the image output timing from the register 108 to perform time synchronization, and instructs the pixel 101 on the timing to start the imaging, and instructs the AD converter 102 on the timing to start the A/D conversion.

FIG. 14 illustrates an example of implementation of the gyro sensor 23.

As illustrated in FIG. 14, the gyro sensor 23 includes a sensor 111, an I2C/I3C slave 112, a CCI slave 113, a register 114, and a time synchronization counter 115.

The sensor 111 corresponds to the detection section 51 in FIG. 2. That is, the sensor 111 detects an angular velocity at a predetermined sampling cycle to write the angular velocity data into the register 114.

The I2C/I3C slave 112 and the CCI slave 113 are included in, for example, the communication processing control section 54 in FIG. 2. That is, the I2C/I3C slave 112 performs communication processing in accordance with the I2C or the I3C controlled in a leading manner by the I2C/I3C master 127 of the AP 31, and the CCI slave 113 performs communication processing in accordance with the CCI controlled in a leading manner by the CCI master 126 of the AP 31. For example, the I2C/I3C slaves 112 notifies the time synchronization counter 115 of detection of the start condition, detection of the ST message, and detection of the EXIT message.

The register 114 corresponds to the register 53 in FIG. 2. That is, set values such as delay time and a sampling cycle are written into the register 114 via the I2C/I3C slave 112 and the CCI slave 113. In addition, the register 114 retains sampling time data outputted from the time synchronization counter 115, and the angular velocity data and the sampling time data are transmitted to the AP 31 via the I2C/I3C slave 112 and the CCI slave 113.

The time synchronization counter 115 corresponds to the time synchronization counter 52 in FIG. 2. That is, the time synchronization counter 115 reads the set values such as the delay time or the sampling cycle from the register 114, and performs time synchronization to instruct the sensor 111 on the timing to start the detection.

FIG. 15 illustrates an example of implementation of the AP 31.

As illustrated in FIG. 15, the AP 31 includes a physical layer processing section 121, a CSI-2 receiver 122, a sensor fusion processing section 123, a register 124, a time synchronization counter 125, the CCI master 126, the I2C/I3C master 127, a memory section 128, and a processor 129.

The physical layer processing section 121 and the CSI-2 receiver 122 are included in, for example, the image data reception section 61 in FIG. 2. That is, the physical layer processing section 121 receives image data transmitted from the image sensor 22 in accordance with the C-PHY or the D-PHY, and the CSI-2 receiver 122 receives the image data in accordance with the CSI-2. Then, the CSI-2 receiver 122 outputs the image data to a data bus, and supplies the image data and the imaging time data to the sensor fusion processing section 123.

The sensor fusion processing section 123 corresponds to the data integration section 65 in FIG. 2. That is, the sensor fusion processing section 123 reads angular velocity data (sensor data) of the sampling time data indicating the same timing as the imaging time data from the register 124, and performs the sensor fusion processing such as correction of the image data.

The register 124 corresponds to the register 64 in FIG. 2, and the time synchronization counter 125 corresponds to the time synchronization counter 62 in FIG. 2.

The CCI master 126 and the I2C/I3C master 127 are included in, for example, the communication processing control section 63 in FIG. 2. That is, the CCI master 126 controls communication processing in a leading manner in accordance with the CCI, and the I2C/I3C master 127 controls communication processing in a leading manner in accordance with the I2C or the I3C. For example, the I2C/I3C master 127 transmits the ST message and the EXIT message in accordance with a timing instructed by the time synchronization counter 125.

The memory section 128 and the processor 129 are included in, for example, the information processing section 66 in FIG. 2.

<Configuration Example of Computer>

Figure 16:
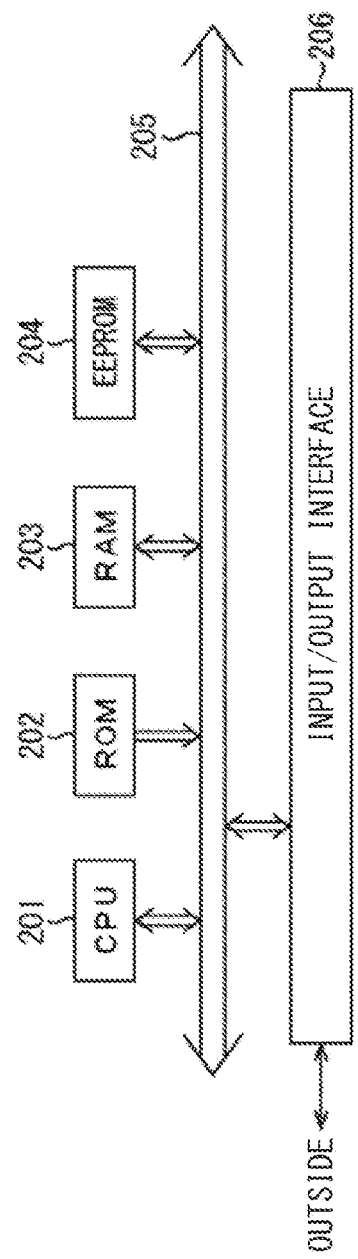
FIG. 16 is a block diagram illustrating a configuration example of an embodiment of a computer to which the present technology is applied.

FIG. 16 is a block diagram illustrating a configuration example of hardware of a computer that executes a series of processing described above by means of a program.

In a computer, a CPU (Central Processing Unit) 201, a ROM (Read Only Memory) 202, a RAM (Random Access Memory) 203, and a EEPROM (Electronically Erasable and Programmable Read Only Memory) 204 are coupled with one another by a bus 205. An input/output interface 206 is further coupled to the bus 205, and the input/output interface 206 is coupled to the outside.

In the computer configured as described above, for example, the CPU 201 loads a program stored in the ROM 202 and the EEPROM 204 into the RAM 203 via the bus 205, and executes the loaded program to thereby perform the series of processing described above. In addition, the program to be executed by the computer (CPU 201) may be installed in the EEPROM 204 or updated from the outside via the input/output interface 206, in addition to being written into the ROM 202 in advance.

Here, in the present specification, processing to be performed by the computer in accordance with the program need not necessarily be performed in a time-sequential manner along the order described as the flowchart. That is, the processing performed in accordance with the program by the computer also includes processing executed in parallel or individually (e.g., parallel processing or object-based processing).

In addition, the program may be performed by one computer (processor), or may be subjected to distributed processing by a plurality of computers. Further, the program may be transferred to and executed by a remote computer.

Further, in the present specification, the term "system" means a set of a plurality of components (devices, modules (parts), etc.), regardless of whether or not all the components exist in the same casing. Accordingly, a plurality of devices housed in separate casings and coupled via a network, and one device in which a plurality of modules is housed in one casing are each a system.

In addition, for example, the configuration described as one device (or processing section) may be divided and configured as a plurality of devices (or processing sections). Conversely, the configuration described above as a plurality of devices (or processing sections) may be collectively configured as one device (or processing section). In addition, it is needless to say that a configuration other than that described above may be added to the configuration of each device (or each processing section). Further, as long as the configuration or operation of the system as a whole is substantially the same, a portion of a configuration of a certain device (or processing section) may be included in a configuration of another device (or another processing section).

In addition, for example, the present technology may adopt a configuration of cloud computing in which one function is shared by a plurality of devices via a network and processing is performed in association.

In addition, for example, the above-described program may be executed by any device. In that case, it is sufficient for the device to have a necessary function (function block or the like) to enable necessary information to be obtained.

In addition, it is possible to execute the respective steps described in the flowcharts described above with one device, and it is also possible to distribute the respective steps to a plurality of devices for execution. Further, in a case where a plurality of pieces of processing is included in one step, it is possible to execute the plurality of pieces of processing included in the one step by one device and it is also possible to distribute the plurality of pieces of processing to a plurality of devices for execution. In other words, a plurality of pieces of processing included in one step may be executed as pieces of processing of a plurality of steps. Conversely, the pieces of processing described as the plurality of steps may be collectively executed as one step.

It is to be noted that the program executed by the computer may be executed so that the pieces of processing in the steps describing the program are executed in a time-sequential manner along the order described in the present specification, or may be executed in parallel or separately at a required timing such as when a call is made. That is, as long as there is no inconsistency, the pieces of processing of the respective steps may be executed in an order different from the order described above. Further, the pieces of processing in the steps describing this program may be executed in parallel with processing of another program, or may be executed in combination with processing of another program.

It is to be noted that the plurality of present technologies described in the present specification can each be implemented independently and singly, as long as they do not cause inconsistency. It goes without saying that any two or more of the present technologies can be implemented in combination. For example, a portion or all of the present technology described in any embodiment can be implemented in combination with a portion or all of the present technology described in another embodiment. Further, a portion or all of any of the above-described present technology can be implemented in combination with another technology that is not described above.

<Example of Combination of Configurations>

It is to be noted that the present technology may also have the following configurations.

(1)

1 A communication device including:
  a communication processing control section that controls communication processing in accordance with a predetermined standard with a plurality of other communication devices;
  a time synchronization counter to implement a timing control defined in the standard; and
  an information processing section that performs information processing necessary for an output control that causes the time synchronization counter to time synchronize with other time synchronization counters included in the respective other communication devices to output sampling data sampled at a predetermined sampling cycle in the plurality of other communication devices,
  the information processing section performing an output control that causes time data indicating a timing at which the sampling data is sampled to be outputted together with the sampling data.

(2)

The communication device according to (1), in which
  the i 2 nformation processing section performs the output control that causes time data indicating a timing at which the sampling data is sampled to be outputted together with the sampling data, in a configuration in which a first other communication device and a second other communication device of the plurality of other communication devices transmit the sampling data via different transmission paths, and
  the communication device further includes a data reception section that
  receives first sampling data transmitted from the first other communication device, and first time data indicating a timing, pursuant to the other time synchronization counter of the first other communication device, at which the first sampling data is sampled via a first transmission path, and
  receives second sampling data transmitted from the second other communication device, and second time data indicating a timing, pursuant to the other time synchronization counter of the second other communication device, at which the second sampling data is sampled via a second transmission path.

(3) 3

The communication device according to (2), further including a data integration section that integrates the second sampling data transmitted from the second other communication device and the first sampling data of the first time data indicating same timing as the second time data of the second sampling data.

(4)

4 The communication device according to any one of (1) to (3), in which, in a configuration in which the plurality of other communication devices transmit the sampling data via same transmission path, the information processing section sets an output timing to instruct the plurality of other communication devices to output the sampling data at mutually different timings, without necessarily performing the output control that causes the time data to be outputted.

(5)

5 The communication device according to (4), further including a data reception section that receives the sampling data transmitted from the plurality of other communication devices via the transmission path.

(6)

A communication method including causing a communication device to
  control communication processing in accordance with a predetermined standard with a plurality of other communication devices, and
  perform information processing necessary for an output control that causes a time synchronization counter for implementing a timing control defined in the standard to time synchronize with other time synchronization counters included in the respective other communication devices to output sampling data sampled at a predetermined sampling cycle in the plurality of other communication devices, in which an output control is performed that causes time data indicating a timing at which the sampling data is sampled to be outputted together with the sampling data.

(7) 6

A program causing a computer of a communication device to execute communication processing, the communication processing including:

controlling communication processing in accordance with a predetermined standard with a plurality of other communication devices; and performing information processing necessary for an output control that causes a time synchronization counter for implementing a timing control defined in the standard to time synchronize with other time synchronization counters included in the respective other communication devices to output sampling data sampled at a predetermined sampling cycle in the plurality of other communication devices, in which an output control is performed that causes time data indicating a timing at which the sampling data is sampled to be outputted together with the sampling data.

(8)

A communication device including:

a sampling section that samples sampling data at a predetermined sampling cycle;

a communication processing control section that controls communication processing in accordance with a predetermined standard with another communication device; and a time synchronization counter to implement a timing control defined in the standard, in which the time synchronization counter time synchronizes with another time synchronization counter included in the other communication device, in accordance with an output control by the other communication device, to output time data indicating a timing at which the sampling data is sampled, together with the sampling data.

(9) 7

The communication device according to (8), in which, in a configuration in which a first communication device and a second communication device of a plurality of the communication devices transmit the sampling data via different transmission paths, second sampling data transmitted from the second communication device and first sampling data of first time data, transmitted from the first communication device, indicating same timing as second time data of the second sampling data are integrated in the other communication device.

(10)

8 The communication device according to (8) or (9), in which, in a configuration in which a plurality of the communication devices transmit the sampling data via same transmission path, the respective communication devices output the sampling data in accordance with an output timing, which is set by the other communication device and instructs the respective individual communication devices to output the sampling data at mutually different timings, without necessarily outputting the time data.

(11)

A communication method including causing a communication device to sample sampling data at a predetermined sampling cycle, control communication processing in accordance with a predetermined standard with another communication device, and cause a time synchronization counter for implementing a timing control defined in the standard to time synchronize with another time synchronization counter included in the other communication device, in accordance with an output control by the other communication device, to output time data indicating a timing at which the sampling data is sampled, together with the sampling data.

(12) 9

A program causing a computer of a communication device to execute communication processing, the communication processing including:

sampling sampling data at a predetermined sampling cycle;

controlling communication processing in accordance with a predetermined standard with another communication device; and causing a time synchronization counter for implementing a timing control defined in the standard to time synchronize with another time synchronization counter included in the other communication device, in accordance with an output control by the other communication device, to output time data indicating a timing at which the sampling data is sampled, together with the sampling data.

It is to be noted that the present embodiment is not limited to the above-described embodiment, and may be modified in a wide variety of ways without departing from the gist of the present disclosure. In addition, the effects described herein are merely illustrative and not limiting, and may have other effects.

REFERENCE NUMERALS LIST 11 communication system
21 range sensor
22 image sensor
23 gyro sensor
24 acceleration sensor
25 position sensor
26 atmospheric pressure sensor
31 AP
41 imaging element
42 time synchronization counter
43 register
44 communication processing control section
45 image data transmission section
51 detection section
52 time synchronization counter
53 register
54 communication processing control section
61 image data reception section
62 time synchronization counter
63 communication processing control section
64 register
65 data integration section
66 information processing section

The invention claimed is:

1. A first communication device, comprising:
a first time synchronization counter configured to execute a timing control based on a specific standard; and
a central processing unit (CPU) configured to:
control, based on the specific standard, communication between the first communication device and a plurality of second communication devices, wherein the plurality of second communication devices includes a plurality of second time synchronization counters;

control, based on the timing control, the first time synchronization counter to time synchronize with the plurality of second time synchronization counters, wherein the plurality of second communication devices:

samples, based on the time synchronization of the first time synchronization counter with the plurality of second time synchronization counters, data at a specific sampling cycle; and outputs the sample;

control an output of time data that indicates a timing at which the data is sampled, wherein the plurality of second communication devices further outputs, based on the control of the output of the time data, the time data in association with the sampled data;

set a plurality of output timings for the plurality of second communication devices independent of the control of the output of the time data, wherein the plurality of output timings is set in a specific configuration in which the plurality of second communication devices outputs the sampled data via same transmission path; and control the plurality of second communication devices to output the sampled data at the plurality of output timings, wherein a first output timing of the plurality of output timings is different from a second output timing of the plurality of output timings.

2. A first communication device, comprising:

a first time synchronization counter configured to execute a timing control based on a specific standard; and a central processing unit (CPU) configured to:

sample a piece of data at a specific sampling cycle;

control, based on the specific standard, communication between the first communication device and a second communication device, wherein the second communication device is different from the first communication device, and the second communication device includes a second time synchronization counter;

control, based on the timing control, the first time synchronization counter to time synchronize with the second time synchronization counter, wherein the second communication device controls an output of time data that indicates a timing at which the piece of data is sampled, and the control of the first time synchronization counter is based on the control of the output of the time data;

control, based on the time synchronization of the first time synchronization counter with the second time synchronization counter, the first time synchronization counter to output the time data in association with the piece of data, wherein in a specific configuration, the second communication device further:

sets a plurality of output timings for a plurality of first communication devices; and controls the plurality of first communication devices to output a plurality of pieces of data at the plurality of output timings, in the specific configuration, the plurality of first communication devices outputs the plurality of pieces of data via same transmission path, the plurality of pieces of data includes the piece of data, the plurality of first communication devices includes the first communication device, and the plurality of output timings includes:

a first output timing for the first communication device, and a second output timing that is different from the first output timing; and output, based on the first output timing, the piece of data in the specific configuration, wherein the output of the piece of data is independent of the output of the time data.

3. A communication method, comprising:

in a first communication device that includes a first time synchronization counter:

executing, by the first time synchronization counter, a timing control based on a specific standard;

sampling a piece of data at a specific sampling cycle;

controlling, based on the specific standard, communication between the first communication device and a second communication device, wherein the second communication device is different from the first communication device, and the second communication device includes a second time synchronization counter;

controlling, based on the timing control, the first time synchronization counter to time synchronize with the second time synchronization counter, wherein the second communication device controls an output of time data that indicates a timing at which the piece of data is sampled, and the control of the first time synchronization counter is based on the control of the output of the time data;

controlling, based on the time synchronization of the first time synchronization counter with the second time synchronization counter, the first time synchronization counter to output the time data in association with the piece of data, wherein in a specific configuration, the second communication device further:

sets a plurality of output timings for a plurality of first communication devices; and controls the plurality of first communication devices to output a plurality of pieces of data at the plurality of output timings, in the specific configuration, the plurality of first communication devices outputs the plurality of pieces of data via same transmission path, the plurality of pieces of data includes the piece of data, the plurality of first communication devices includes the first communication device, and the plurality of output timings includes:

a first output timing for the first communication device, and a second output timing that is different from the first output timing; and outputting, based on the first output timing, the piece of data in the specific configuration, wherein the output of the piece of data is independent of the output of the time data.

4. A non-transitory computer-readable medium, having stored thereon, computer-executable instructions that, when executed by a computer, cause the computer to execute operations, the operations comprising:

executing, by a first time synchronization counter of a first communication device, a timing control based on a specific standard;

sampling a piece of data at a specific sampling cycle;

controlling, based on the specific standard, communication between the first communication device and a second communication device, wherein
- the second communication device is different from the first communication device, and
- the second communication device includes a second time synchronization counter;

controlling, based on the timing control, the first time synchronization counter to time synchronize with the second time synchronization counter, wherein
- the second communication device controls an output of time data that indicates a timing at which the piece of data is sampled, and
- the control of the first time synchronization counter is based on the control of the output of the time data;

controlling, based on the time synchronization of the first time synchronization counter with the second time synchronization counter, the first time synchronization counter to output the time data in association with the piece of data, wherein
- in a specific configuration, the second communication device further:
  - sets the plurality of output timings for the plurality of first communication devices; and
  - controls the plurality of first communication devices to output a plurality of pieces of data at the plurality of output timings,
- in the specific configuration, the plurality of first communication devices outputs the plurality of pieces of data via same transmission path,
- the plurality of pieces of data includes the piece of data,
- the plurality of first communication devices includes the first communication device, and
- the plurality of output timings includes:
  - a first output timing for the first communication device, and
  - a second output timing that is different from the first output timing; and outputting, based on the first output timing, the piece of data in the specific configuration, wherein the output of the piece of data is independent of the output of the time data.

5. A first communication device, comprising:
a first time synchronization counter configured to execute a timing control based on a specific standard; and
a central processing unit (CPU) configured to:
  sample a piece of data at a specific sampling cycle;
  control, based on the specific standard, communication between the first communication device and a second communication device, wherein
    the second communication device is different from the first communication device, and
    the second communication device includes a second time synchronization counter;
  control, based on the timing control, the first time synchronization counter to time synchronize with the second time synchronization counter, wherein
    the second communication device controls an output of time data that indicates a timing at which the piece of data is sampled, and
    the control of the first time synchronization counter is based on the control of the output of the time data;
  control, based on the time synchronization of the first time synchronization counter with the second time synchronization counter, the first time synchronization counter to output the time data in association with the piece of data, wherein
    in a specific configuration, the second communication device further:
      sets a plurality of output timings for a plurality of first communication devices; and
      controls the plurality of first communication devices to output a plurality of pieces of data at the plurality of output timings,
    in the specific configuration, the plurality of first communication devices outputs the plurality of pieces of data via same transmission path,
    the plurality of pieces of data includes the piece of data,
    the plurality of first communication devices includes the first communication device,
    the plurality of output timings includes:
      a first output timing for the first communication device, and
      a second output timing that is different from the first output timing; and
  output, based on the first output timing, the piece of data in the specific configuration, wherein the output of the piece of data is independent of the output of the time data.

6. A communication method, comprising:
in a first communication device that includes a first time synchronization counter:
  executing, by the first time synchronization counter, a timing control based on a specific standard;
  sampling a piece of data at a specific sampling cycle;
  controlling, based on the specific standard, communication between the first communication device and a second communication device, wherein
    the second communication device is different from the first communication device, and
    the second communication device includes a second time synchronization counter;
  controlling, based on the timing control, the first time synchronization counter to time synchronize with the second time synchronization counter, wherein
    the second communication device controls an output of time data that indicates a timing at which the piece of data is sampled, and
    the control of the first time synchronization counter is based on the control of the output of the time data;
  controlling, based on the time synchronization of the first time synchronization counter with the second time synchronization counter, the first time synchronization counter to output the time data in association with the piece of data, wherein
    in a specific configuration, the second communication device further:
      sets a plurality of output timings for a plurality of first communication devices; and
      controls the plurality of first communication devices to output a plurality of pieces of data at the plurality of output timings,
    in the specific configuration, the plurality of first communication devices outputs the plurality of pieces of data via same transmission path,
    the plurality of pieces of data includes the piece of data, the plurality of first communication devices includes the first communication device,
the plurality of output timings includes:
a first output timing for the first communication device, and
a second output timing that is different from the first output timing; and
outputting, based on the first output timing, the piece of data in the specific configuration, wherein the output of the piece of data is independent of the output of the time data.

7. A non-transitory computer-readable medium, having stored thereon, computer-executable instructions that, when executed by a computer, cause the computer to execute operations, the operations comprising:
executing, by a first time synchronization counter of a first communication device, a timing control based on a specific standard;
sampling a piece of data at a specific sampling cycle;
controlling, based on the specific standard, communication between the first communication device and a second communication device, wherein
the second communication device is different from the first communication device, and
the second communication device includes a second time synchronization counter;
controlling, based on the timing control, the first time synchronization counter to time synchronize with the second time synchronization counter, wherein
the second communication device controls an output of time data that indicates a timing at which the piece of data is sampled, and
the control of the first time synchronization counter is based on the control of the output of the time data;
controlling, based on the time synchronization of the first time synchronization counter with the second time synchronization counter, the first time synchronization counter to output the time data in association with the piece of data, wherein
in a specific configuration, the second communication device further:
sets the plurality of output timings for the plurality of first communication devices; and
controls the plurality of first communication devices to output a plurality of pieces of data at the plurality of output timings,
in the specific configuration, the plurality of first communication devices outputs the plurality of pieces of data via same transmission path,
the plurality of pieces of data includes the piece of data,
the plurality of first communication devices includes the first communication device,
the plurality of output timings includes:
a first output timing for the first communication device, and
a second output timing that is different from the first output timing; and
outputting, based on the first output timing, the piece of data in the specific configuration, wherein the output of the piece of data is independent of the output of the time data.

* * * * *